(12) United States Patent
Kurauchi

(10) Patent No.: US 7,369,706 B2
(45) Date of Patent: May 6, 2008

(54) IMAGE-DATA PROCESSING DEVICE, IMAGE-DATA PROCESSING METHOD, IMAGE-DATA DISTRIBUTING DEVICE AND IMAGE-DATA TRANSMITTING SYSTEM

(75) Inventor: Nobukazu Kurauchi, Nagoya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 836 days.

(21) Appl. No.: 10/747,181

(22) Filed: Dec. 30, 2003

(65) Prior Publication Data

US 2004/0151393 A1 Aug. 5, 2004

(30) Foreign Application Priority Data

Jan. 6, 2003 (JP) ............................. 2003-000274

(51) Int. Cl.
*G06K 9/36* (2006.01)

(52) U.S. Cl. ..................... 382/239; 382/250; 382/232; 382/251; 375/240.02; 375/240.2; 375/240.24

(58) Field of Classification Search ................ 382/205, 382/239, 250, 240, 232, 251; 375/240.02, 375/240.2, 240.24
See application file for complete search history.

(56) References Cited

U.S. PATENT DOCUMENTS 5,359,438 A * 10/1994 Maeda ........................ 358/539
5,699,458 A * 12/1997 Sprague ...................... 382/250

5,710,829 A * 1/1998 Chen et al. .................. 382/173

(Continued)

FOREIGN PATENT DOCUMENTS

JP 58-75390 5/1983

(Continued)

OTHER PUBLICATIONS

□□Song, et al. "Fast Extraction of Spatially Reduced Image Sequences from MPEG-2 Compressed Video." IEEE Transactions on Circuits and Systems for Video Technology 9/7(1999): 1100-1114.*

*Primary Examiner*—Samir Ahmed
*Assistant Examiner*—Michael A Newman
(74) *Attorney, Agent, or Firm*—Wenderoth, Lind & Ponack, L.L.P.

(57) ABSTRACT

An image processing device for processing an original image divided into a plurality of blocks that are made up of a plurality of picture elements from encoded image-data which is obtained by encoding a spatial-frequency component of the block as a plurality of spatial-frequency coefficients, and producing reduced encoded image-data which is encoded data on a reduced image that is obtained by reducing the original image to a given reduction rate. If the block in the encoded image-data of the original image is in an area where the value of the function is small due to gentle change in brightness or color of the image, for example, only the direct-current component coefficient of is used for the block. On the other hand, if the block is in a area where the value of the function is large because the area is a boundary area, for example, such as an outline in the image, limited number of lower spatial frequency-coefficients are used for the block. The number is based on the reduction rate of the image.

28 Claims, 12 Drawing Sheets

U.S. PATENT DOCUMENTS

| | | | | |
|---|---|---|---|---|
| 6,067,384 A | * | 5/2000 | Manickam et al. | 382/250 |
| 6,611,626 B1 | * | 8/2003 | de Queiroz | 382/239 |
| 6,621,867 B1 | * | 9/2003 | Sazzad et al. | 375/240.26 |
| 6,757,427 B1 | * | 6/2004 | Hongu | 382/164 |
| 6,771,703 B1 | * | 8/2004 | Oguz et al. | 375/240.03 |
| 6,937,770 B1 | * | 8/2005 | Oguz et al. | 382/235 |
| 6,983,079 B2 | * | 1/2006 | Kim | 382/275 |

FOREIGN PATENT DOCUMENTS

| | | |
|---|---|---|
| JP | 2000-59612 | 2/2000 |

* cited by examiner

IMAGE-DATA PROCESSING DEVICE, IMAGE-DATA PROCESSING METHOD, IMAGE-DATA DISTRIBUTING DEVICE AND IMAGE-DATA TRANSMITTING SYSTEM

BACKGROUND OF THE INVENTION

1. Field of the Invention

The present invention relates to a processing device, a processing method, a distributing device and a transmitting system for encoded image-data. Specifically, it relates to the art of producing reduced encoded image-data for a reduction image, using encoded image-data.

2. Description of the Related Art

In recent years, data transmission over a network has become faster, and household appliances such as a personal computer and a digital television receiver have come into wider use. This helps put image-information providing services to practical and broad use. Particularly, such image-information is handled as digital image-data, thus making the quantity of data more massive. This requires operations to be made efficiently, such as image-data storage and transmission. In the field where image-data is handled, there is the art of compressing and encoding image-data. Especially, in the field where static images (or still pictures) are handled, an image compressing-and-encoding art, called the JPEG (Joint Photographic Experts Group), is generally known.

As an example in which such an image compressing-and-encoding art based on the JPEG is in use, there is a field of an electronic still camera which is generally called a digital camera. In the electronic still camera, a photographed image is compressed and encoded into the JPEG form to reduce the quantity of data, and then, it is recorded on a storage medium. In addition, as another example, there is an image distributing system in which image-data is compressed and encoded into the JPEG form and then is distributed. The more advanced a network technology such as the Internet gets, the more popular has this system become.

In the field of an electronic still camera, image-data (hereinafter, called the JPEG image) which is held in the JPEG form inside the camera is generally recorded on a recording medium such as a secure digital (SD) card. In this case, in general, a plurality of JPEG images are also produced as reduced images for printing reference to record them on a recording medium. Such a reduced image is called a thumbnail image. If a plurality of thumbnail images are collected and simultaneously printed out, that printout is called an index print.

To produce this index print, a plurality of JPEG images have to be restored, and then, a thumbnail image needs to be produced for each of them. In other words, restoring a plurality of JPEG images requires a considerable quantity of processing, thereby taking quite a bit of processing time for index printing.

Aiming to resolve this disadvantage, an image processing technology is proposed of producing a thumbnail image at high speed, using image-data which is compressed and encoded (e.g., refer to Patent Document 1: Japanese Patent Laid-Open No. 2000-59612 specification). Patent Document 1 discloses a technology of dividing an original image into blocks called macro-blocks, and producing a thumbnail image by using only a direct-current component coefficient which is included in encoded data that is obtained by encoding a spatial-frequency component of each macro-block. According to this prior art (hereinafter, named Prior Art 1), a thumbnail image is produced using only a direct-current component coefficient. This helps save the time to process an alternating-current component coefficient, or some other time, thereby heightening the speed of processing.

Furthermore, as described above, there is known an image distributing system which uses a network such as the Internet, as another example in which an image compressing-and-encoding technology is used. As such a system, the one that uses a thumbnail image is known. In this image distributing system, a distributor transmits, as an index image used to select an image, thumbnail image-data which corresponds to an image size desired by a user. Then, the user selects a desired image, using this thumbnail image. Next, the user notifies the distributor of a request to distribute the image selected by the user. Thereby, the distributor distributes request contents of a dynamic image (or moving picture) or the like which corresponds to the image selected by the user. Such an image distributing system is practically used in the field of an image distributing system. In this field, especially, users have various desires. Thus, a reduced image such as a thumbnail image is distributed of a variety of sizes. In this case, if the distributed thumbnail image is small, the user can watch a large number of images at the same time. But if it is too small, then the user will find it difficult to view its contents.

Accordingly, a technology is proposed which is capable of confirming a thumbnail image swiftly, and in addition, distributing a thumbnail image of image size desired by the user, if necessary (e.g., refer to Patent Document 2: Japanese Patent Laid-Open No. 58-75390 specification). Patent Document 2 discloses a technology of dividing an original image into macro-blocks, selecting, from among low-frequency component coefficients which are included in encoded data that is obtained by encoding a spatial-frequency component of each macro-block, those coefficients limited in number depending on an image size to be restored, transmitting the same, and producing thumbnail images of the desired sizes at a receiver. More specifically, in this method, an original image is divided into macro-blocks, and encoding conversion processing is executed on an original-image signal which is sampled using a plurality of sampling values of each macro-block. From among a plurality of spatial-frequency coefficients which are obtained in this encoding conversion processing, a plurality of low-frequency component coefficients are selected as one set of coefficients. Herein, the low-frequency component coefficients are fewer than the spatial-frequency coefficients obtained by the encoding conversion processing and include only low-frequency components. The distributor transmits the set of coefficients, for each macro-block, to the receiver. The receiver executes, on this set of coefficients, a decoding conversion which conforms to the size of sample arrangements which correspond to the number of these coefficients. This reproduces an image which has a smaller sampling value than the sampling value of the original image, or a reduced image. This configuration enables transmission time or processing time to be saved as long as the image is allowed to have a small size, according to the prior art (hereinafter, named Prior Art 2) which is disclosed by Patent Document 2. According to Prior Art 2, the larger the reduction rate of an image becomes and the closer it gets to 1, the higher spatial-frequency component coefficients will be and the larger the number of them will be. If required image sizes are large, this prevents the quality of an image from becoming poorer because of a shortage of encoding coefficients.

However, if a relatively large thumbnail image is handled, in Prior Art 1 which uses only a direct-current component coefficient included in encoded data, the image quality becomes poor noticeably. In Prior Art 2, where from among low-frequency component coefficients included in encoded data, a large number of those coefficients suited to a large image size are selected, there is a disadvantage in that processing time or transmission speed is almost on the same level as that of an original image.

In other words, Prior Art 1 uses only a direct-current component coefficient which corresponds to an average picture-element value of each macro-block. Thereby, the larger the image size becomes, the larger a so-called block noise becomes. In Prior Art 2, the larger the image size becomes, the more coefficients are handled and the closer the number of coefficients gets to that of the original image. This lowers processing speed or transmission speed.

Furthermore, in a method of Prior Art 2, an original image is encoded according to a reduction rate every time when it is distributed. This requires encoding for each distribution. As a result, if the number of terminals on the receiver side increases, that makes heavier a load of encoding processing. In other words, encoding has to be executed whenever distribution is conducted. This increases the number of times when encoding processing is executed and makes the processing's load heavier. This processing's load could cause the time from a distribution request to a distribution to be delayed. Furthermore, according to Prior Art 2, an image is held as original-image data which is not compressed and encoded, a storing means having a greater storage capacity is needed than in the case of compressed and encoded image data.

SUMMARY OF INVENTION

In view of the aforementioned disadvantages, it is an object of the present invention to provide an image-data processing device and an image-data processing method which are capable of, even in the case where a relatively large thumbnail image is handled, displaying the thumbnail image at high speed without making the image quality poor, as well as to provide an image-data distributing device and an image-data transmitting system which are capable of transmitting the thumbnail image.

According to an aspect of the present invention, an original image is divided into a plurality of blocks that are made up of a plurality of picture elements, and in each block, from encoded image-data which is obtained by encoding a spatial-frequency component of the block as a plurality of spatial-frequency coefficients, reduced encoded image-data is produced which is encoded data on a reduced image that is obtained by reducing the original image to a given reduction rate. If the block in the encoded image-data of the original image is in an area where the value of the function is small due to gentle change in brightness or color of the image, for example, only the direct-current component coefficient of it is used for the block. On the other hand, if the block is in a area where the value of the function is large because the area is a boundary area, for example, such as an outline in the image, limited number of lower spatial frequency-coefficients are used for the block. The number is based on the reduction rate of the image.

Accordingly, an aspect of the present invention provides an image-data processing device and an image-data processing method which enable, even in the case where a relatively large thumbnail image is handled, display of the thumbnail image at high speed without making the image quality poor, as well as an image-data distributing device and an image-data transmitting system which are capable of transmitting the thumbnail image.

These and other objects, features and advantages of the present invention will become more apparent upon reading of the following detailed description along with the accompanied drawings.

DETAILED DESCRIPTION OF INVENTION

Hereinafter, embodiments of the present invention will be described with reference to the accompanied drawings.

First Embodiment

Figure 1:
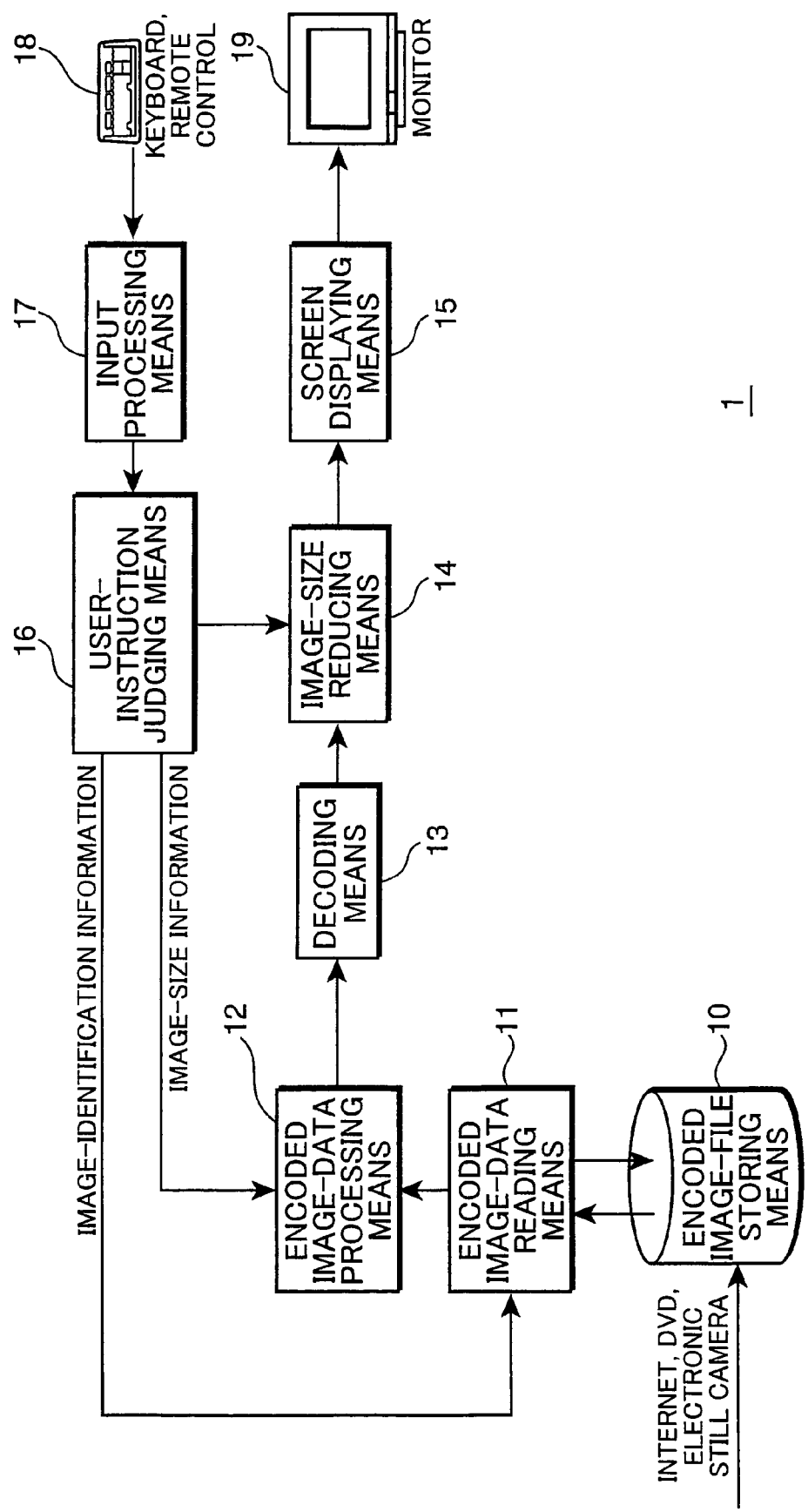
FIG. 1 is a block diagram of an image-data processing device according to a first embodiment of the present invention, showing its whole configuration.

FIG. 1 is a block diagram of an image-data processing device according to a first embodiment of the present invention, showing its whole configuration. This image-data processing device 1 is characterized by abstracting, from a storing means which stores image-data compressed and encoded by a method such as the JPEG, image-data designated by a user, and then, displaying an image of the image size which corresponds to a reduction rate designated by the user.

In FIG. 1, an inputting means 18 is a keyboard, a remote control or the like. A user operates this inputting means 18 and inputs the user's various instructions. An input processing means 17 notifies a user-instruction judging means 16 of the instructions inputted from the user as instruction information. The user-instruction judging means (hereinafter, called the judging means) 16 analyzes the contents of the instructions from the user, based on the instruction information. Then, the judging means 16 commands each section to execute processing according to the analysis result. In addition, it notifies them of information for the processing. For example, if a user gives instructions to display a reduced image, then the judging means 16 outputs information such as the name and the like of an image file and the size of an image instructed by the user. In FIG. 1, processing of reducing an image is executed which is a characteristic of the image-data processing device 1. Thus, the judging means 16 is configured so as to output image-identification information for searching for the instructed image file and image-size information for displaying an image of the instructed image size.

An encoded image-file storing means (hereinafter, called the storing means) 10 functions as an encoded image-data storing means. It includes a record medium, for example, such as a hard disk. On this record medium, image-data compressed and encoded by a method such as the JPEG (hereinafter, called the encoded image-data) is stored as an image file. The stored image file is obtained, by a user's operation, from the Internet, a CD-ROM (compact disc-ROM), a DVD (digital video disc), an electronic still camera or the like. Thus, in the storing means 10, a plurality of image files are stored as encoded image files of an original image. An encoded image-data reading means (hereinafter, called the reading means) 11 reads an image file which corresponds to the image-identification information, from the plurality of image files stored in the storing means 10. The read image file undergoes each steps of processing, and then, is displayed, by a screen displaying means 15, on a monitor 19 which functions as a displaying means.

In this way, a user can designate and display a desired image file, from among the plurality of image files stored in the storing means 10. In addition, if the user searches for a desired image file from among a large number of image files stored in the storing means 10, the user can seek out a desired image easily, using an index display which displays a plurality of thumbnail images. Furthermore, the image-data processing device 1 is characterized in that it also allow the user to designate the display size of a thumbnail image. In other words, the image-data processing device 1 is characterized by having a means for producing a thumbnail image of the image size which corresponds to the reduction rate designated by a user.

An encoded image-data processing means (hereinafter, called the processing means) 12 is a processing means for converting an image file read by the reading means 11, or encoded image-data which corresponds to one image, into a thumbnail image, or image-data for a reduced image. The processing means 12 converts the encoded image-data, based on image-size information from the judging means 16, into reduced encoded image-data which is the encoded image-data that corresponds its reduction size.

A decoding means 13 decodes the encoded image-data of this reduced encoded image-data to restore it to decoded image-data of the same size as the original image. An image-size reducing means (hereinafter, called the reducing means) 14 produces reduced image-data by thinning out picture elements for the decoded image-data obtained by the decoding means 13, according to image sizes designated by a user. The screen displaying means 15 outputs the reduced image-data to the monitor 19 so that the reduced image-data is displayed on the screen of the monitor 19.

As described above, in the image-data processing device 1 according to this first embodiment, the encoded image-data of an original image which is stored in the storing means 10 is read, reduced encoded image-data for a reduced image which corresponds to image-size information is produced by the processing means 12, reduced encoded image-data is decoded and reduced in image size, and thereby, a thumbnail image of an original image is displayed on the monitor 19.

Figure 2:
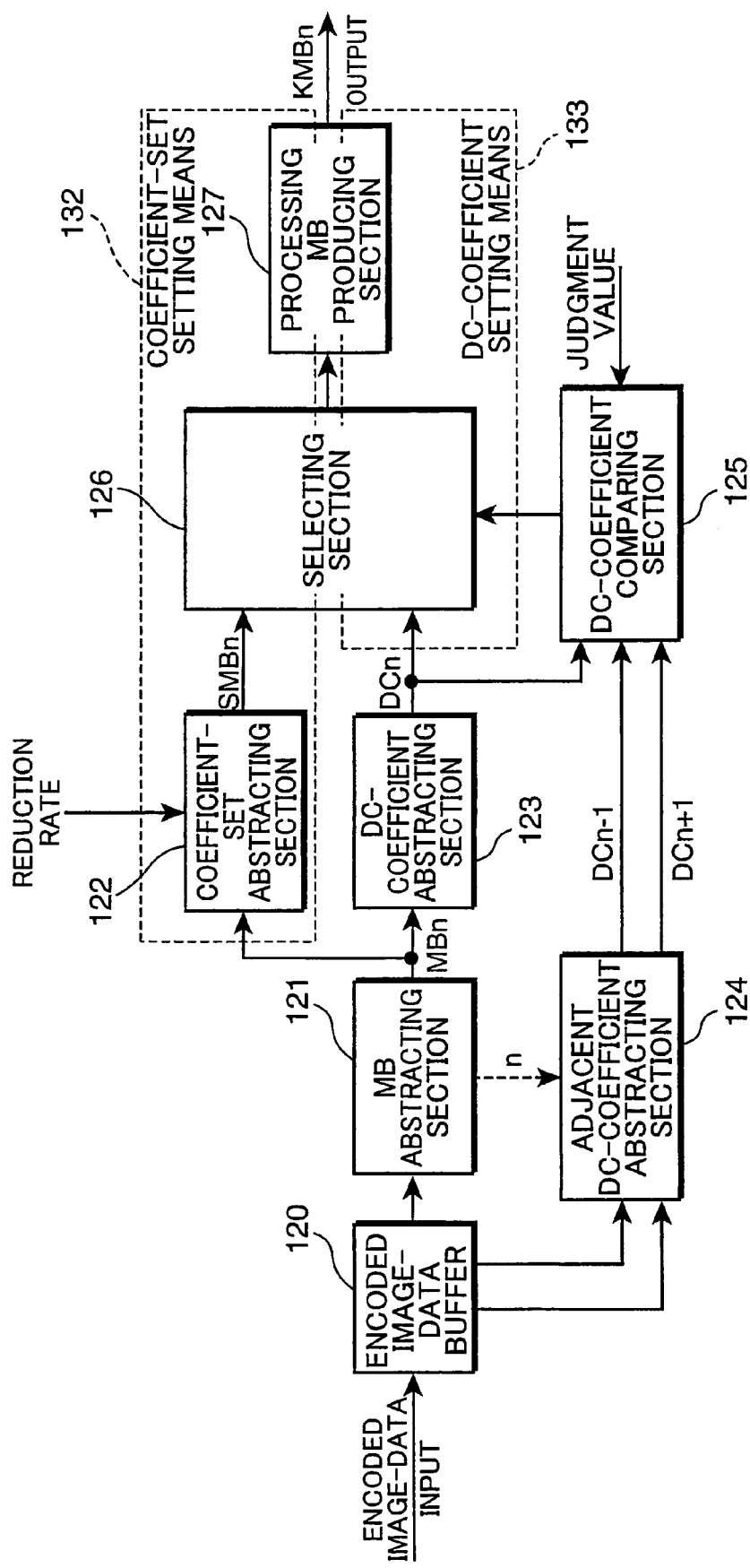
FIG. 2 is a block diagram of the image-data processing device according to the first embodiment of the present invention, showing the detailed configuration of its encoded image-data processing means.

FIG. 2 is a block diagram of this image-data processing device according to this embodiment, showing the detailed configuration of the processing means 12. In FIG. 2, an encoded image-data buffer (hereinafter, called the buffer) 120 temporarily stores user-designated encoded image-data which is read by the reading means 11.

A macro-block abstracting section (hereinafter, called the MB abstracting section) 121 abstracts one after another, from the buffer 120, the encoded image-data which corresponds to each macro-block. FIG. 2 shows that the MB abstracting section 121 abstracts the $n_{th}$ macro-block MBn. The abstracted macro-block MBn is named a block to be processed because the following processing is executed on the abstracted macro-block MBn. For example, if encoding is executed by the JPEG method, the original image-data which is not encoded is divided into 8×8 picture-element blocks, and then, each block undergoes a discrete-cosine conversion. As a result, spatial-frequency coefficients which correspond to the spatial-frequency components of each block are obtained. In addition, for each block, 8×8 coefficients are obtained as spatial-frequency coefficients, from a direct-current component coefficient (hereinafter, called the DC coefficient) which is a coefficient of a direct-current component, to AC coefficients which are coefficients of alternating-current components, or to higher spatial-frequency components. These 8×8 coefficients are configured as a macro-block which is one block. The encoded image-data is configured by combining a plurality of such macro-blocks. Thus, if the encoded image-data is the JPEG form, when the $n_{th}$ macro-block is processed, the MB abstracting section 121 abstracts the 8×8 coefficients of the macro-block MBn.

A coefficient-set abstracting section 122 abstracts, as reduction coefficient-sets, the number of coefficients which corresponds to a reduction rate for reducing an original image, from among a plurality of coefficients included in the macro-block MBn. These reduction coefficient-sets are abstracted from low-frequency coefficients including the DC coefficients. Herein, the number of the reduction coefficient-sets is smaller than that of the coefficients included in the macro-block MBn. The coefficient-set abstracting section 122 outputs, as reduction coefficient-sets SMBn, the reduction coefficient-sets abstracted in this way.

A DC-coefficient abstracting section 123 abstracts only a DC coefficient, from among a plurality of coefficients included in the macro-block MBn, and outputs a DC coefficient DCn as a direct-current component coefficient.

An adjacent DC-coefficient abstracting section 124 abstracts adjacent direct-current component coefficients (hereinafter, called the adjacent DC coefficient) of the macro-blocks adjacent to the macro-block MBn which is a block to be processed. Herein, an example is shown in which adjacent DC coefficients DCn−1 and DCn+1 are abstracted as adjacent DC coefficients of the macro-blocks adjacent, right and left in the horizontal directions, to an image. However, they are not limited only to the adjacent macro-blocks in the horizontal directions. Adjacent DC coefficients of the macro-blocks adjacent in the vertical directions and an oblique direction may also be used.

A DC-coefficient comparing section 125 is provided with the DC coefficient DCn from the DC-coefficient abstracting section 123 and the adjacent DC coefficients DCn−1 and DCn+1 from the adjacent DC-coefficient abstracting section 124. Then, it compares and judges these DC coefficients. First, the DC-coefficient comparing section 125 compares the DC coefficient DCn of the block to be processed with the adjacent DC coefficients DCn−1 and DCn+1 which are to be compared. Herein, if a plurality of adjacent macro-blocks are used, as an example, the average value of adjacent DC coefficients is seen as the average DC coefficient, which is compared with the DC coefficient DCn. In addition, for example, a weighting value may also be varied according to adjacent directions to set a weighted-average value as the average DC coefficient. In addition, as another example, the DC coefficient DCn may also be compared, with each adjacent DC coefficient to determine, as the comparison result, the largest absolute value of their differences. Or, instead, a summation of absolute values of the differences between the DC coefficient DCn and the adjacent DC coefficients may be calculated as the comparison result. Only one adjacent DC coefficient may also be used. In this case, a difference between the DC coefficient DCn and the adjacent DC coefficient can be calculated as the comparison result. Thus, the DC-coefficient comparing section 125 compares the DC coefficient DCn of the block to be processed with the adjacent DC coefficient(s). Then, it detects a difference value as its comparison result.

As an example of a weighted-average value, the twenty-four blocks inside of 5×5 blocks which are arranged around the macro-block MBn to be processed is set as an adjacent block. Then, weighting may also be executed according to their distances from the macro-block MBn. In this case, the longer the distance from the macro-block MBn is, the less weighting may be executed. Or, weighting of the macro-blocks which are adjacent, up-and-down and right-and-left, to the macro-block MBn may also be made 1; and weighting of the macro-blocks which are adjacent in oblique directions, $1/\sqrt{2}$. Besides, according to properties of each image, weighting in a specific direction may also be made heavier. For example, weighting in a lower-right direction may also be made heavier; and weighting in an upper-left direction, lighter.

The DC-coefficient comparing section 125, in general, calculates the value of a function of the DC coefficient DCn and the at least one adjacent DC coefficients such as DCn−1 and DCn+1. The function represents an extent of unevenness between the DC coefficient DCn and the at least one adjacent DC coefficients. The absolute values of the various differences mentioned above correspond to examples of the value of the function.

Next, the DC-coefficient comparing section 125 compares the absolute value of the detected value of difference with a predetermined judgment value, with respect to which is larger. At this time, if the absolute value of the difference is larger than the judgment value, it notifies a selecting section 126 (described later) of a boundary detection result which shows that a boundary has been detected. On the other hand, if the absolute value of the difference is smaller than the judgment value, it notifies the selecting section 126 of a boundary detection result which shows that a boundary has not been detected. In this way, by comparing the DC coefficient DCn of the block to be processed with the adjacent DC components, the DC-coefficient comparing section 125 judges whether the macro-block MBn to be processed is the boundary part of an image such as an outline. A DC coefficient represents the average value of picture-element values of one macro-block. Thus, the macro-block which has a great difference in the average picture-element value between the macro-block itself and the adjacent ones is judged the image's boundary area. The selecting section 126 is notified of such a judgment result on the image's boundary area, as the boundary detection result.

The selecting section 126, based on this boundary detection result, abstracts the reduction coefficient-set SMBn from the coefficient-set abstracting section 122, or the DC coefficient DCn from the DC-coefficient abstracting section 123. If the selecting section 126 is notified of the boundary detection result which shows that a boundary has been detected, then it selects the reduction coefficient-set SMBn. On the other hand, if the selecting section 126 is notified of the boundary detection result which shows that a boundary has not been detected, then it selects the DC coefficient DCn. The selecting section 126 provides the coefficients selected and abstracted in this way, to a processed macro-block producing section (hereinafter, called the processed MB producing section) 127.

The processed MB producing section 127, among as many coefficients as picture elements inside of the macro-block MBn, sets the abstracted reduction coefficient-set SMBn or DC coefficient DCn as the coefficient which corresponds to the frequency. It also sets all the coefficients which correspond to the other frequencies to zero. Then, it outputs it as a processed macro-block KMbn.

Herein, as shown in FIG. 2, the coefficient-set abstracting section 122, the selecting section 126 and the processed MB producing section 127 function as a coefficient-set setting means 132 according to the present invention. The selecting section 126 and the processed MB producing section 127 function as a DC-coefficient setting means 133 according to the present invention.

A detailed operation will be described below, of the image-data processing device 1 according to this embodiment which is configured as described above. An operation will be described mainly of the encoded image-data processing means 12 which has a characteristic of this image-data processing device.

Figure 3:
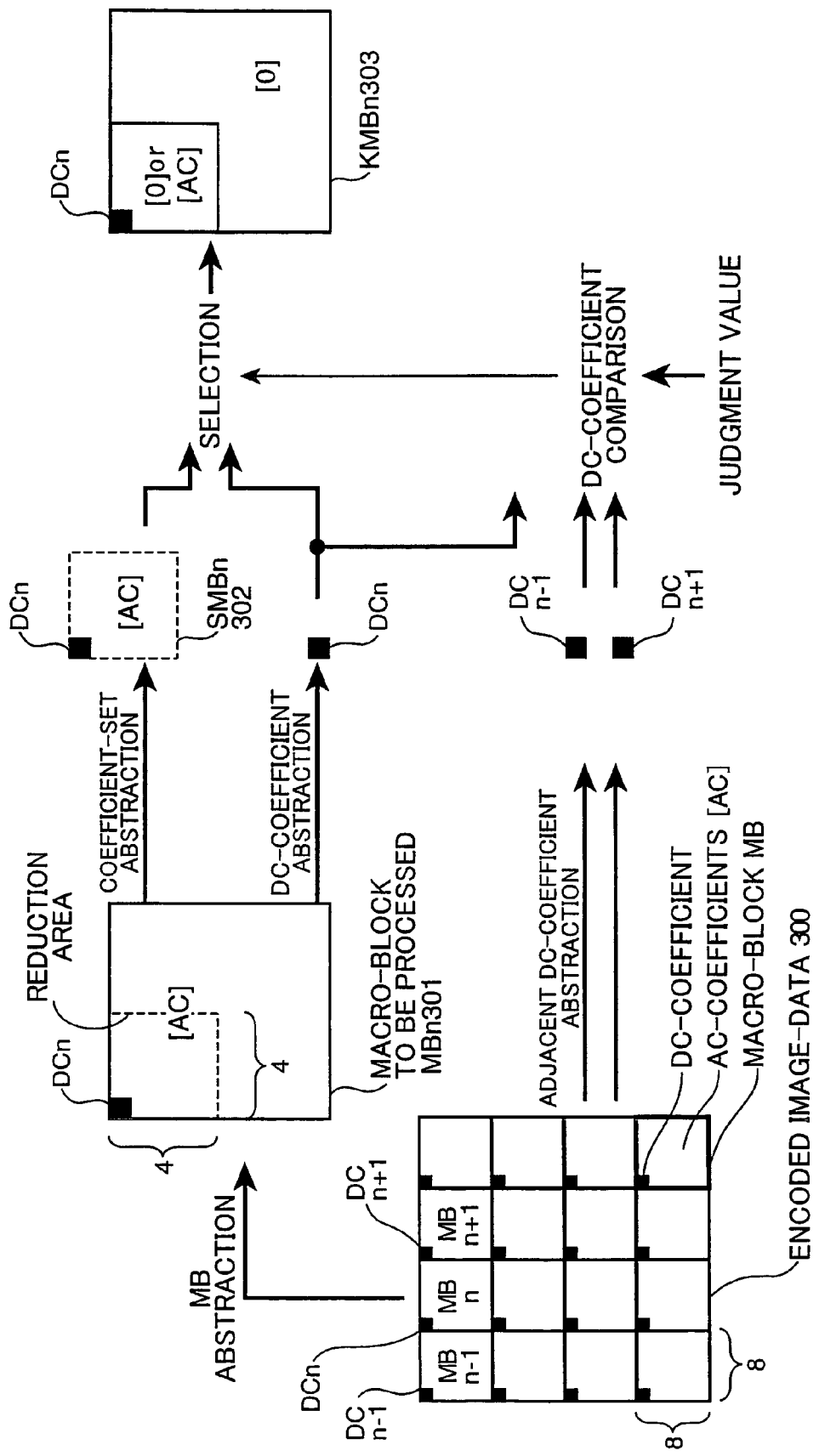
FIG. 3 is an illustration, showing a macro-block and each coefficient which are processed by the encoded image-data processing means.

FIG. 3 is an illustration, showing a macro-block and each coefficient which are processed by the processing means 12 as described in FIG. 2. In FIG. 3, encoded image-data 300 is an example of the encoded image-data stored temporarily in the buffer 120 in FIG. 2. Herein, as the original image, an example is shown of an image of 32×32 picture elements. This image is divided into macro-blocks of 8×8 picture elements, and thus, it is configured by 4×4 macro-blocks. In addition, for example, by a discrete-cosine conversion, each macro-block is converted into 8×8 spatial-frequency coefficients. Thus, a macro-block MB is made up of a set of sixty-four coefficients. In each macro-block MB, these plurality of coefficients are made up of a DC coefficient DC and a plurality of AC coefficients [AC] which correspond to each frequency (hereinafter, the plurality of coefficients will be shown by a bracket [ ]). In addition, in FIG. 3, the macro-block MB to be processed is shown as the macro-block MBn which is the $n_{th}$ macro-block MBn. The following description will be made using the macro-block MBn as a typical example. However, the same processing is executed for each macro-block.

Hence, in the case where a reduced image such as a thumbnail image is displayed, the image-data processing device 1 reads the encoded image-data 300 which corresponds to the original image from the storing means 10, and then, stores it temporarily in the buffer 120.

Next, in the processing means 12, processing is executed on each macro-block of the encoded image-data 300. This is aimed at displaying a reduced image at the reduction rate which corresponds to instructions from a user. The MB abstracting section 121 abstracts encoded image-data included in each macro-block, one after another, from the buffer 120. A macro-block MBn 301 to be processed in FIG. 3 is a macro-block to be presently processed as the $n_{th}$ macro-block. Then, in the coefficient-set abstracting section 122, a reduction area is set to produce the reduction coefficient-set SMBn which corresponds to the reduced image. This reduction area is set according to reduction rates of the displayed image. Herein, a case is shown in which, if an image is reduced, for example, to the area of one Kth, the reduction area is also set to one Kth. More specifically, if the user wants the image to be reduced to half its longitudinal and lateral lengths, the reduction area is also set to half its longitudinal and lateral lengths. Herein, the longitudinal length means the one in the vertical directions of the image; and the lateral length, in the horizontal directions. In FIG. 3, the macro-block includes 8×8 coefficients, and thus, in this reduction area, 4×4 coefficients which correspond to half its longitudinal and lateral lengths are to be processed. In other words, lower spatial-frequency coefficients including the DC coefficients are to be processed, one after another. The coefficient-set abstracting section 122 abstracts coefficients to be processed inside of the reduction area. As shown in FIG. 3, it outputs them as a reduction coefficient-set SMBn 302.

Figure 4:
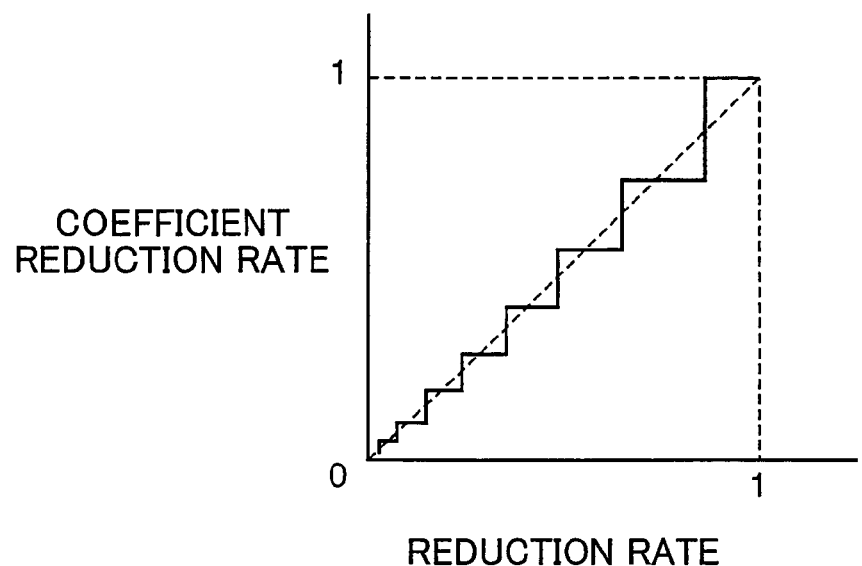
FIG. 4 is a graphical representation, showing an example of the relation between a reduction rate and a coefficient reduction rate.
Figure 5:
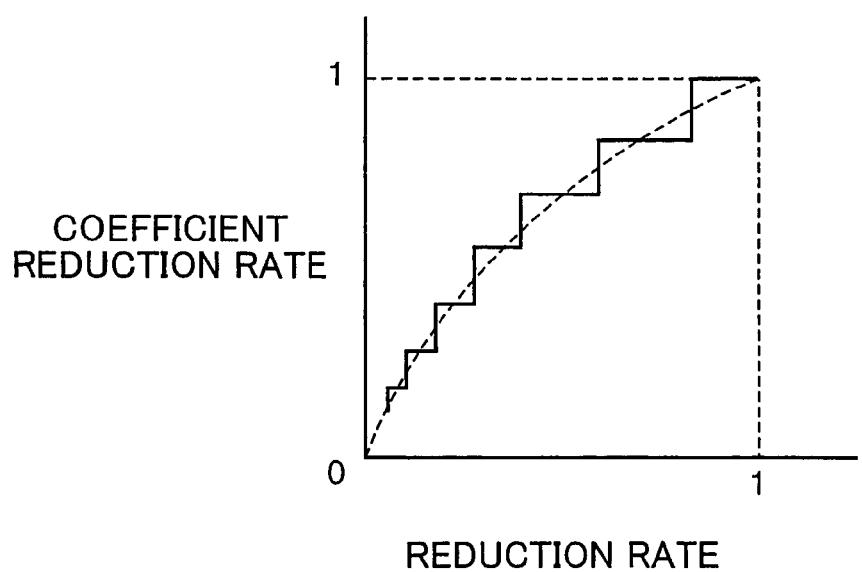
FIG. 5 is a graphical representation, showing another example of the relation between a reduction rate and a coefficient reduction rate.

Herein, the ratio of the size of a reduced image to the size of an original image is set as a reduction rate, and the ratio of, to the number of a plurality of spatial-frequency coefficients included in a macro-block, the smaller number of spatial-frequency coefficients which are selected than the plurality of spatial-frequency coefficients is set as a coefficient reduction rate. In this case, as illustrated in FIG. 4, the reduction rate may also be divided into a plurality of levels, and then, the coefficient reduction rate may also be set according to each reduction rate level. In addition, as illustrated in FIG. 5, a nonlinear conversion may also be executed. For example, if the reduction rate is made a quarter, the coefficient reduction rate may also be set to twenty-five sixty-fourths. In this case, an image is reduced to half its longitudinal and lateral lengths. If a macro-block includes 8×8 coefficients, 5×5 coefficients in a reduction area are to be processed. Such a conversion is effective in the case where it is necessary to prevent an image from becoming poor because of a reduction. In contrast, for example, if an image is reduced to half its longitudinal and lateral lengths, for a macro-block which includes 8×8 coefficients, 3×3 coefficients in a reduction area may also be processed. Such a conversion is effective in the case where a processing speed or the like is more important than the quality of an image.

Back in FIG. 3, the DC coefficient DCn abstracted by the DC-coefficient abstracting section 123, as described above, is to be compared with adjacent DC-coefficients by the DC-coefficient comparing section 125. The selecting section 126 is notified of the boundary detection result which shows that a boundary has been detected. Then, the selecting section 126, based on this boundary detection result, executes a selection between the reduction coefficient-set SMBn from the coefficient-set abstracting section 122 and the DC coefficient DCn from the DC-coefficient abstracting section 123. Next, the processed MB producing section 127 produces the processed macro-block KMbn. Herein, the processed macro-block KMbn has the same number of coefficients as the macro-block MBn, but all its coefficients other than the reduction coefficient-set SMBn or the DC coefficient DCn are set at Zero. A processed macro-block KMbn 303 shown in FIG. 3 is an example of the processed macro-block KMbn produced in that way.

Figure 6:
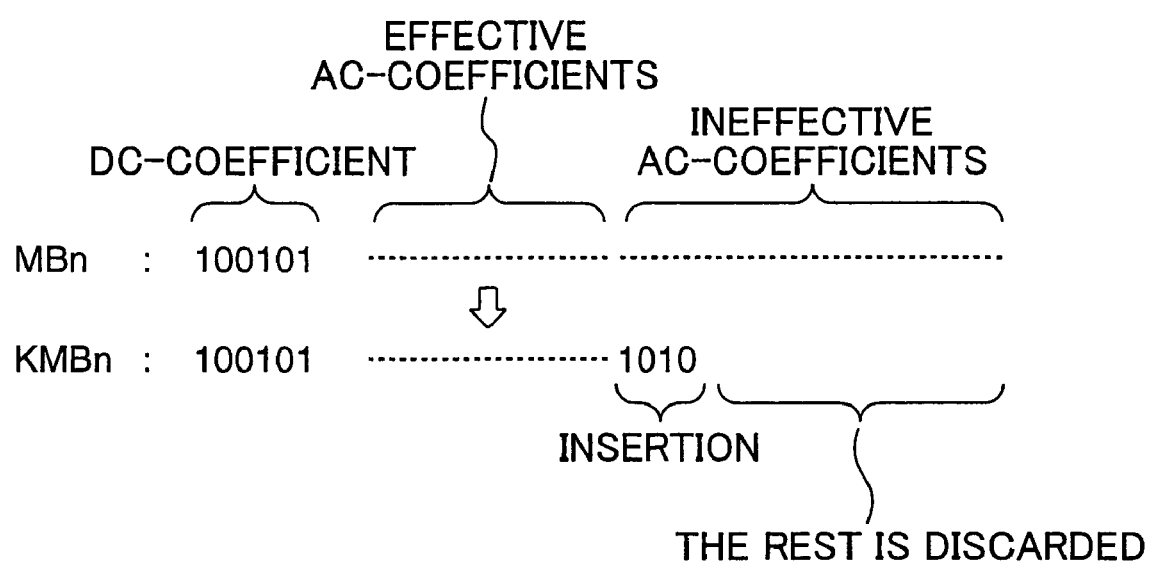
FIG. 6 is a description, illustrating the relation between a macro-block MBn and a processed macro-block KMBn.

As described above, the encoded image-data processing means 12 produces reduced encoded image-data, without decoding encoded image-data and by processing the encoded image-data as it is. Accordingly, if an illustration is given of the encoded image-data of the macro-block MBn by the MB abstracting section 121 and the encoded image-data of the processed macro-block KMbn outputted by the processed MB producing section 127, that will be such bit strings as shown in FIG. 6. In other words, in the encoded image-data of the macro-block MBn, a string of bits of the DC coefficient is followed by a string of bits of the AC coefficients, in order of its lower frequency. On the other hand, in the encoded image-data of the processed macro-block KMbn outputted by the processed MB producing section 127, the bits which are located from the head to a certain part of the string of bits of the encoded image-data of the processed macro-block KMbn are left over because they are seen effective, but the rest are discarded. If the string of bits of the macro-block MBn has already undergone variable-length coding (or Huffman coding in an example of the JPEG), the processed MB producing section 127 inserts, into the end of the left-over string of bits, the EOB (End Of Block, e.g., "1010" in the binary notation) which is a code showing the end of the string of bits of a macro-block. Then, the remaining string of bits is eliminated. The EOB shows that the eliminated remaining string of bits are zero, and more specifically, all the coefficients other than the reduction coefficient-set SMBn or the DC coefficient DCn are set to be zero. On the other hand, if the string of bits of the macro-block MBn has not yet undergone variable-length coding, the processed MB producing section 127 expresses with the run-length that all the remaining bits are zero. In any case, the encoded image-data of the processed macro-block KMbn is compressed to the data which has fewer bits than the encoded image-data of the macro-block MBn. Thereby, the reduced encoded image-data lightens the load on a transmission medium which is caused by a transmission. This allows the time which is taken for a transmission to be cut down.

Using such processing as described above, the processing means 12 processes, based on visual properties of an image, the encoded image-data 300 into the reduced encoded image-data for a reduced image. This is aimed at reducing the quantity of data. According to human visual properties, if an image is reduced, the smaller the reduction rate becomes and the closer it gets to zero, the more difficult it becomes to identify the detail of the image. In other words, the smaller the reduction rate of the image becomes, the more high-frequency components become unnecessary among the AC coefficients of macro-blocks. The smaller the reduction rate becomes, the fewer coefficients on the abstracted low-frequency side the coefficient-set abstracting section 122 abstracts, using such visual properties. In addition, an image boundary part such as the outline of an image includes more high-frequency components as spatial-frequency components. In contrast, in an area where the change in brightness or color of an image is gentle, the spatial-frequency components concentrate on the low-frequency side. In other words, in an area where the brightness or the change in color of an image is gentle, the image would not be poor, even if macro-blocks include only DC components.

Figure 7:
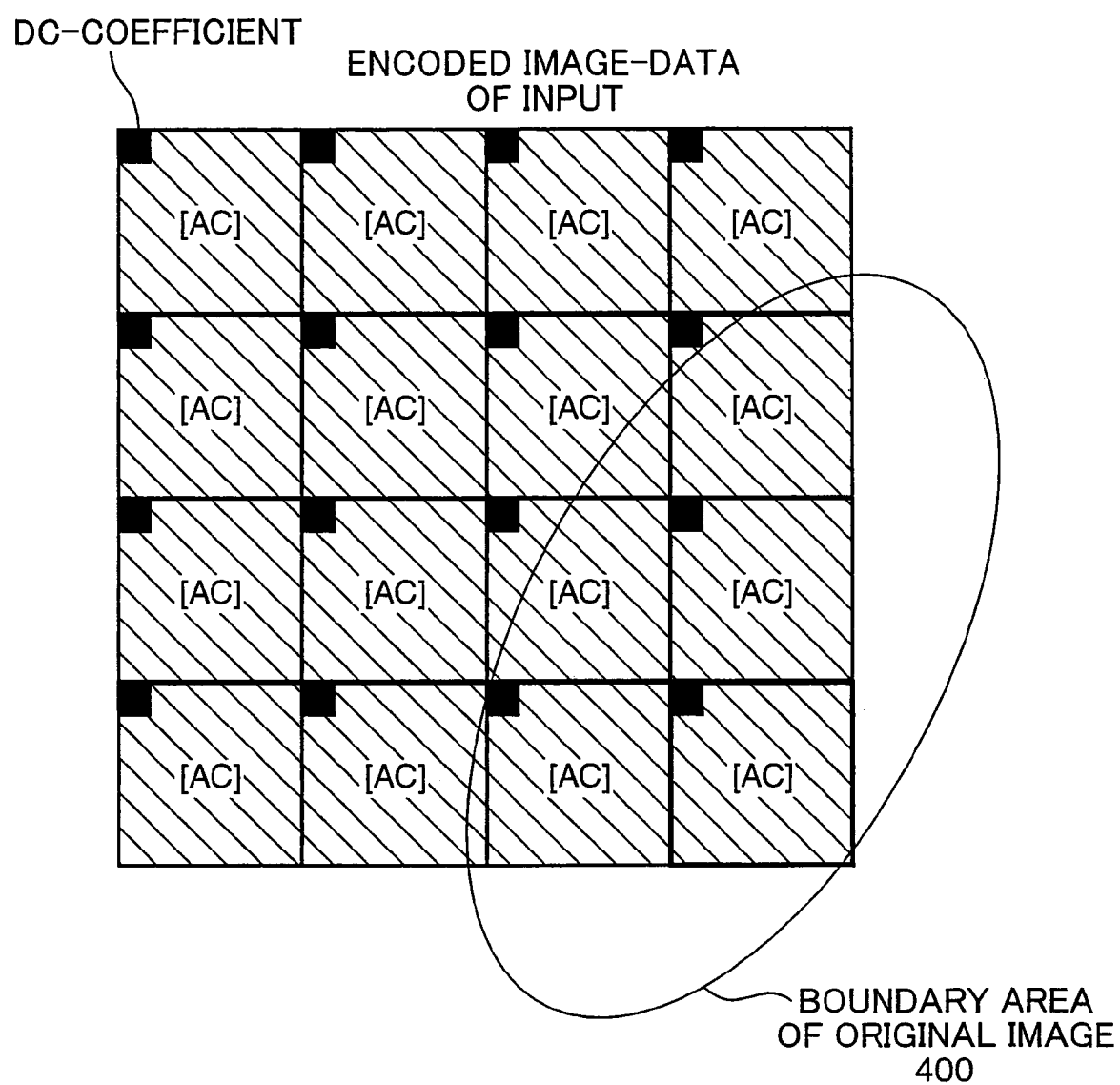
FIG. 7 is an illustration, showing an example of inputted encoded image-data.
Figure 8:
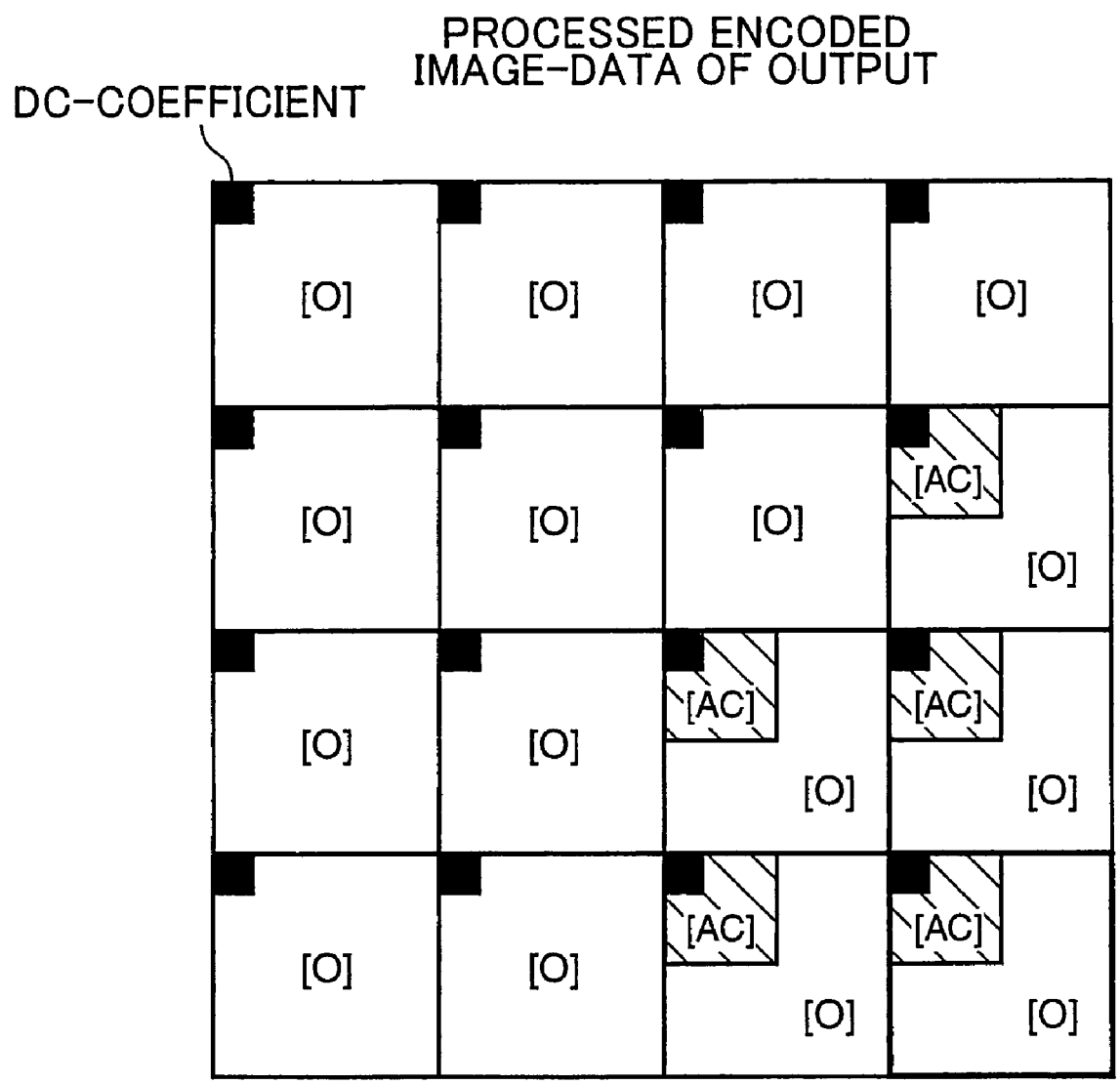
FIG. 8 is an illustration, showing an example of encoded image-data which is processed by the encoded image-data processing means.

FIG. 7 is an illustration, showing an example of encoded image-data inputted to the processing means 12. FIG. 8 is an illustration, showing an example of reduced encoded image-data, or processed encoded image-data outputted from the processing means 12 as a result of the encoded image-data in FIG. 7 being processed. FIG. 7 shows a case in which there is a boundary area 400 such as the outline of an original image in the position of macro-blocks shown in this figure. The macro-blocks located outside of the boundary area 400 represent an area where the change in brightness or color is gentle. In addition, in each macro-block, AC coefficients (shown by [AC]) which are shown by an oblique-line area and reach up to high-frequency components are set, as well as a DC coefficient. As shown in FIG. 8, in an area where the change in brightness or color of an image is gentle, each coefficient except the DC coefficients is set to zero (shown by [0]). In addition, in the image boundary part such as the outline, reduction coefficient-sets which include DC coefficients and correspond to the reduction rate, are set, and the parts outside of the reduction coefficient-sets are set to zero.

As described above, the image-data processing device 1 produces a reduced image, using visual properties of an image. In an area where the change in brightness or color of an image is gentle, it uses only the DC coefficients of macro-blocks. In a boundary area such as the outline of an image, it uses the coefficients on the low-frequency side which correspond to the reduction rate of the image. Furthermore, the image-data processing device 1 sets all the unused coefficients on the high-frequency side to zero, as ineffective coefficients (e.g., it inserts the EOB and deletes the following string of bits, as shown in FIG. 6). Then, it outputs them as processed macro-blocks, and decodes such processed macro-blocks, using the decoding means 13. Accordingly, as shown in FIG. 8, it sets unnecessary coefficients of the processed macro-blocks to zero, thereby lessening decoding processing and thus displaying a reduced image at higher speed. Furthermore, according to the reduction rate of an image and whether or not it is the boundary area of the image, the image-data processing device 1 suitably varies the number of effective coefficients. This enables it to display a reduced image such as a thumbnail image without making its image quality poor. Furthermore, the image-data processing device 1 produces image-data for a reduced image by processing encoded image-data of an original image. Hence, there is no need for a storing means or the like which stores and holds beforehand the image-data for a reduced image.

The image-data processing device 1 may be configured by only hardware which does not need any programs. However, it may also be configured so as to include a microcomputer and a memory which memorizes, as a program, each process of the processing executed by the image-data processing device 1. In the case of the former, FIG. 1 and FIG. 2 represent the configuration of hardware in the image-data processing device 1. In the case of the latter, at least one part of the blocks shown in FIG. 1 and FIG. 2 represents a configuration based on functions of the image-data processing device 1, or represents its functions. If the image-data processing device 1 includes a microcomputer, the microcomputer reads a program from a memory, and thus, executes each process of an image-data processing method prescribed by the program. This program may be provided by means of a record medium such as a ROM (or read only memory) and a CD-ROM. It can also be provided over a transmission medium such as a network.

FIG. 2 illustrated the configuration where the coefficient-set abstracting section 122 abstracts the reduction coefficient-sets SMBn and the DC-coefficient abstracting section 123 abstracts the DC coefficient DCn irrespective of the comparison result of the DC-coefficient comparing section 125 so that the selecting section 126 selects the reduction coefficient-sets SMBn or the DC coefficient DCn on the basis of the comparison result. Instead, the encoded image-data processing means 12 may also be configured so that the coefficient-set abstracting section 122 abstracts the reduction coefficient-sets SMBn only when the DC-coefficient comparing section 125 judges that the absolute difference value is larger than the judgment value.

Figure 9:
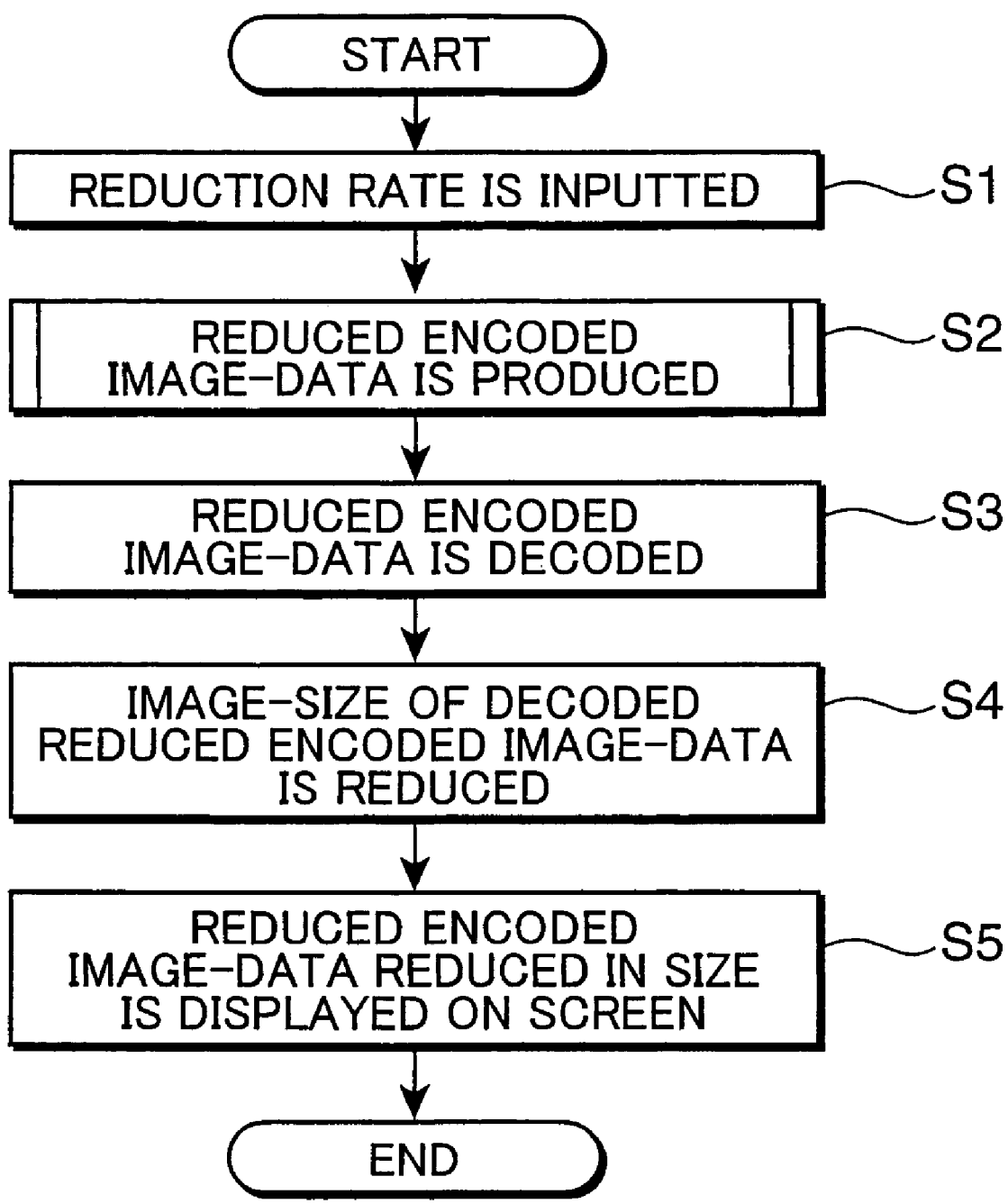
FIG. 9 is a flow chart, showing an operational process of the image-data processing device in FIG. 1.
Figure 10:
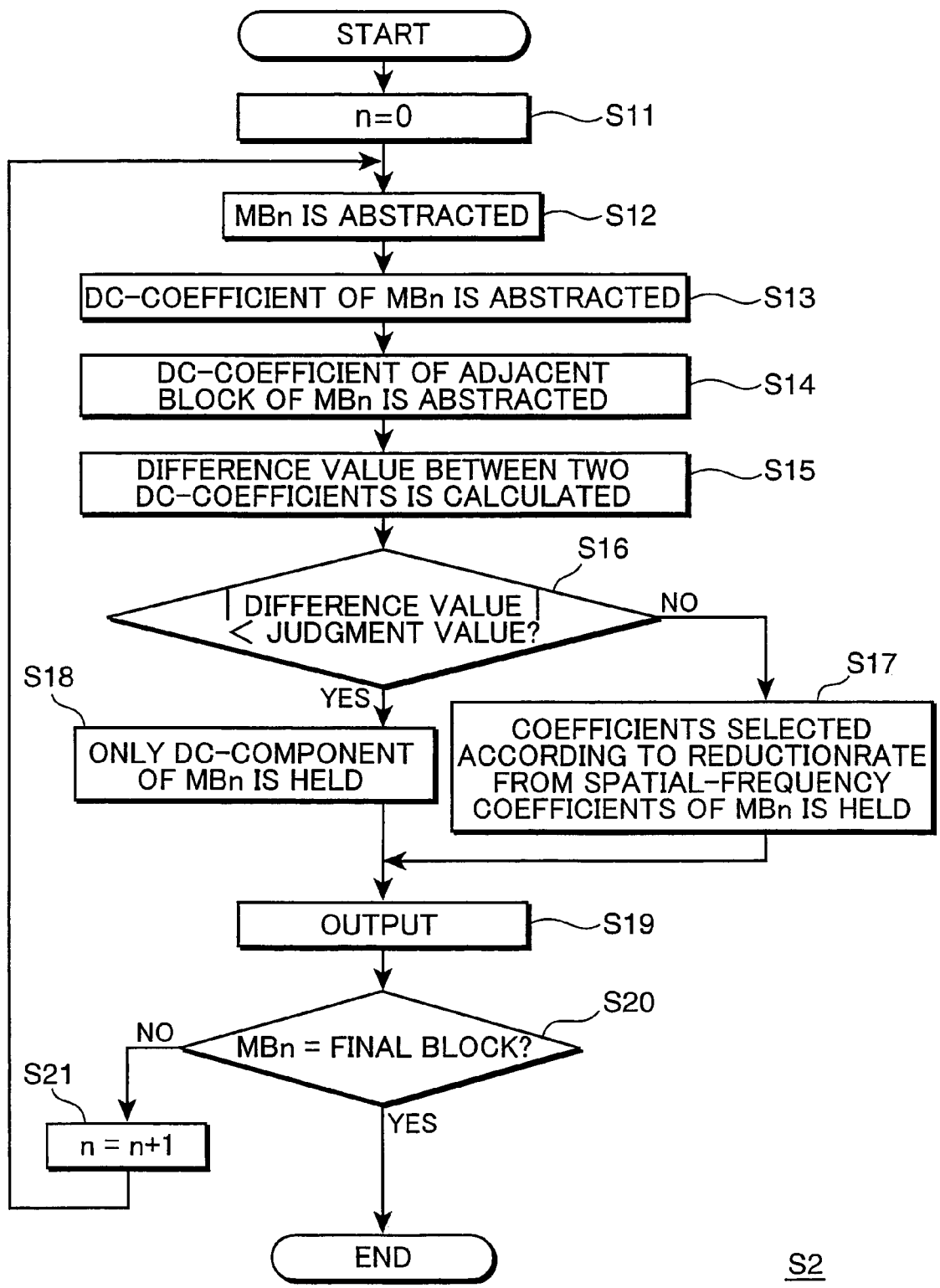
FIG. 10 is a flow chart, showing an example of the processing process of a step S2 in FIG. 9.

FIG. 9 and FIG. 10 are flow charts, showing an outline of each process of the processing executed by the image-data processing device 1. A detailed description has already been made of the contents of the processing, and thus, that description is not made here again.

As shown in FIG. 9, when the processing starts, first, a user inputs, in the input processing means 17, a request to designate encoded image-data to be reduced and encoded, and information such as a reduction rate (S1). Then, the input processing means 17 receives various instructions by the user. Next, the encoded image-data processing means, using the encoded image-data instructed by the user, produces reduced encoded image-data based on the reduction rate instructed by the user (S2). Then, the decoding means 13 decodes the reduced encoded image-data which has been produced at step S2 (S3). Next, the image-size reducing means 14 reduces the image size of the reduced encoded image-data which has been decoded (S4). Then, the image displaying means 15 displays the reduced encoded image-data which has been reduced, on the screen of the displaying means 19 (S5).

The process of the step S2 is shown in the flow chart of FIG. 10. When the processing of the step S2 starts, for example, the MB abstracting section 121 resets a control variable n to zero (S11). Next, the MB abstracting section 121 abstracts encoded image-data of the macro-block MBn from the encoded image-data stored in the encoded image-data buffer 120 (S12). Then, the DC-coefficient abstracting section 123 abstracts a DC coefficient of the macro-block MBn (S13). About that time, or at the same time, the adjacent DC-coefficient abstracting section 124 abstracts DC coefficients of the adjacent blocks (S14). For example, the adjacent DC-coefficient abstracting section 124 obtains the control variable n from the MB abstracting section 121 (see FIG. 2). Thereby, it can identify the macro-block MBn to be processed and can specify the adjacent blocks which corresponds to that.

Next, the DC-coefficient comparing section 125 calculates the difference value of the DC coefficient (S15), and compares an absolute value of the calculated difference value with a judgment value (S16). If the absolute value of the difference value is equal to, or larger than, the judgment value (No at S16), the coefficient-set setting means 132 holds spatial-frequency coefficients on the low-frequency side which have been selected according to the reduction rate out of the spatial-frequency coefficients of the macro-blocks MBn. Then, it sets the other spatial-frequency coefficients to zero (S17). On the other hand, if the absolute value of the difference value is smaller than the judgment value (Yes at S16), the DC-coefficient setting means 133 holds only a DC coefficient of the macro-block MBn. Then, it sets the other spatial-frequency coefficients to zero (S18). In other words, the coefficient-set setting means 132 and the DC-coefficient setting means 133 produce a processed macro-block KMbn. Then, the coefficient-set setting means 132 and the DC-coefficient setting means 133 output the processed macro-block KMbn (S19).

Next, the MB abstracting section 121 judges whether the macro-block MBn is the final macro-block (S20). If the macro-block MBn is the final macro-block (Yes at S20), the encoded image-data processing means 12 completes the processing. If it is not the final macro-block (No at S20), the MB abstracting section 121 executes an increment in the control variable n (S21). After the step S21, the encoded image-data processing means 12 returns the processing to the step S12.

Figure 11:
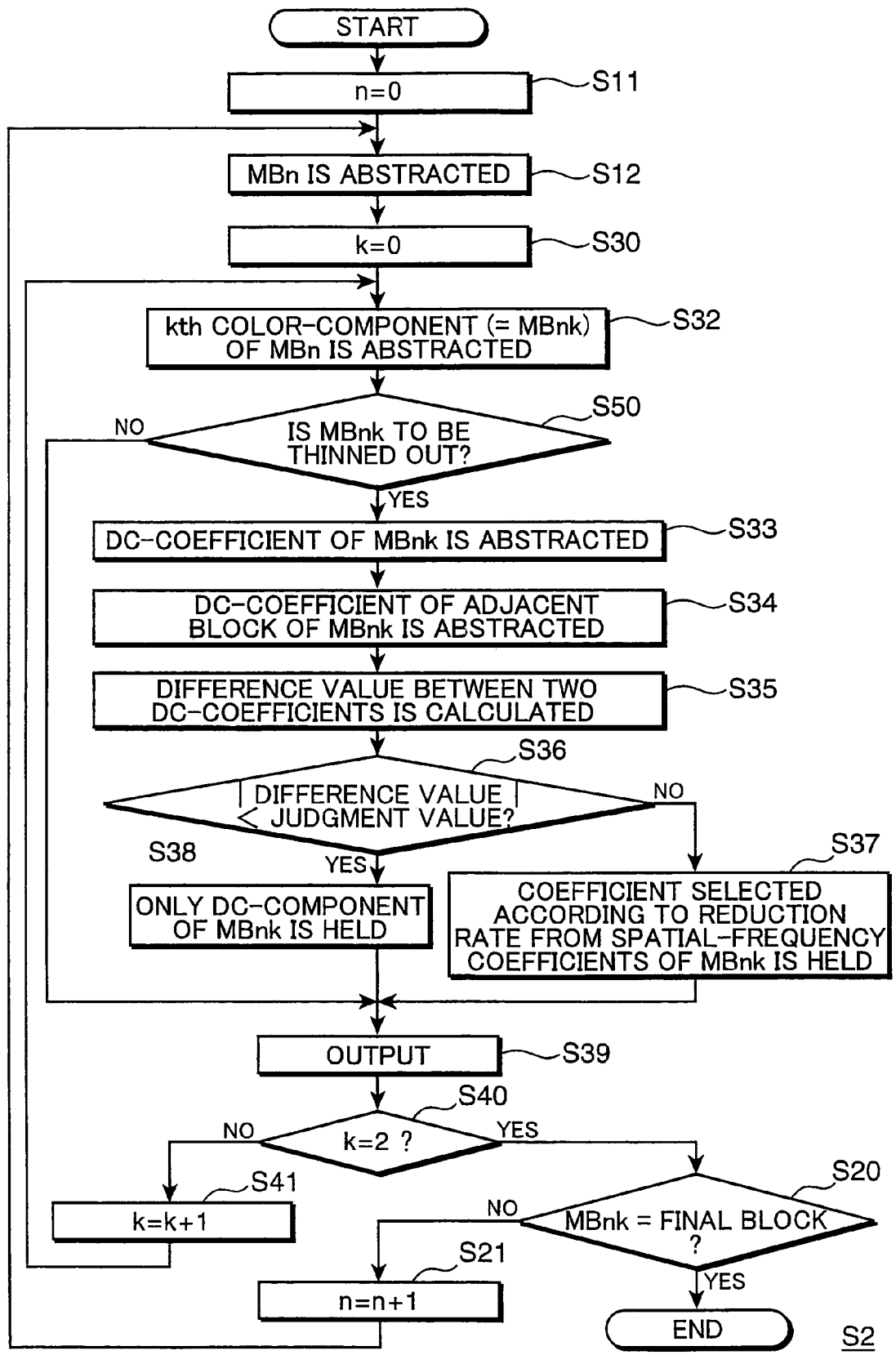
FIG. 11 is a flow chart, showing another example of the processing process of a step S2 in FIG. 9.

If the encoded image-data to be processed by the encoded image-data processing means 12 is encoded image-data which is colored, as shown in FIG. 11, the encoded image-data processing means 12 may execute, on each macro-block MBn, the processing corresponding to the steps S12 to S19 of FIG. 10, for each of three color components, for example. In FIG. 11, the same reference numerals and characters are given to the same processing as those in FIG. 10. In the process of FIG. 11, on each macro-block MBn, the processing in steps S32 to S39 is repeatedly executed for the control variable k=0, 1, 2 which corresponds to the three color components. In other words, the processing of the steps S32 to S39 is executed within the loop of the steps S32 to S41 of which one circuit is made for every control variable k. In the steps S32 to S39, processing corresponding to the steps S12 to S19 of FIG. 10 is executed for the kth color component MBnk of the macro-block MBn. For example, the processing of the step S32 is executed, in the same way as that of the step S12, by the MB abstracting section 121. The control variable k may be set, in the same way as the control variable n, by the MB abstracting section 121.

Herein, the judgment value in the step S36 may also be given individually for every color component. In addition, the coefficient reduction rate in the step S37 may also be given individually for every color component. For example, if encoded image-data to be processed is expressed with the system of Y (brightness), U (shade) and V (the difference of colors), the judgment value of the Y component may be set smaller than that of the U component and the V component, and its coefficient reduction rate may be set higher (i.e., its reduction degree may be set lower) than that of them.

As described as a step S50 in FIG. 11, depending on the control variable k which corresponds to each of color components, spatial-frequency coefficients may not be eliminated (No at S50), or they may be eliminated (Yes at S50). Only if spatial-frequency coefficients are eliminated, the processing of the steps S33 to S38 is executed. If spatial-frequency coefficients are not eliminated, the kth color component MBnk of the macro-block MBn is outputted as it is, as the kth color component of the processed macro-block KMbn (S39). In order to output the kth color component MBnk of the macro-block MBn as it is as the kth color component of the processed macro-block KMbn, the processing of the steps S33 to S37 may also be executed by setting the judgment value for the control variable k to a negative value in the step S36, and setting the coefficient reduction rate for the control variable k to one in the step S37. Instead, in the block diagram of FIG. 2, the control variable k may also be directly inputted in the processed MB producing section 127, so that the MB abstracting section 121 directly outputs the macro-block MBn as the processed macro-block KMbn.

Second Embodiment

Figure 12:
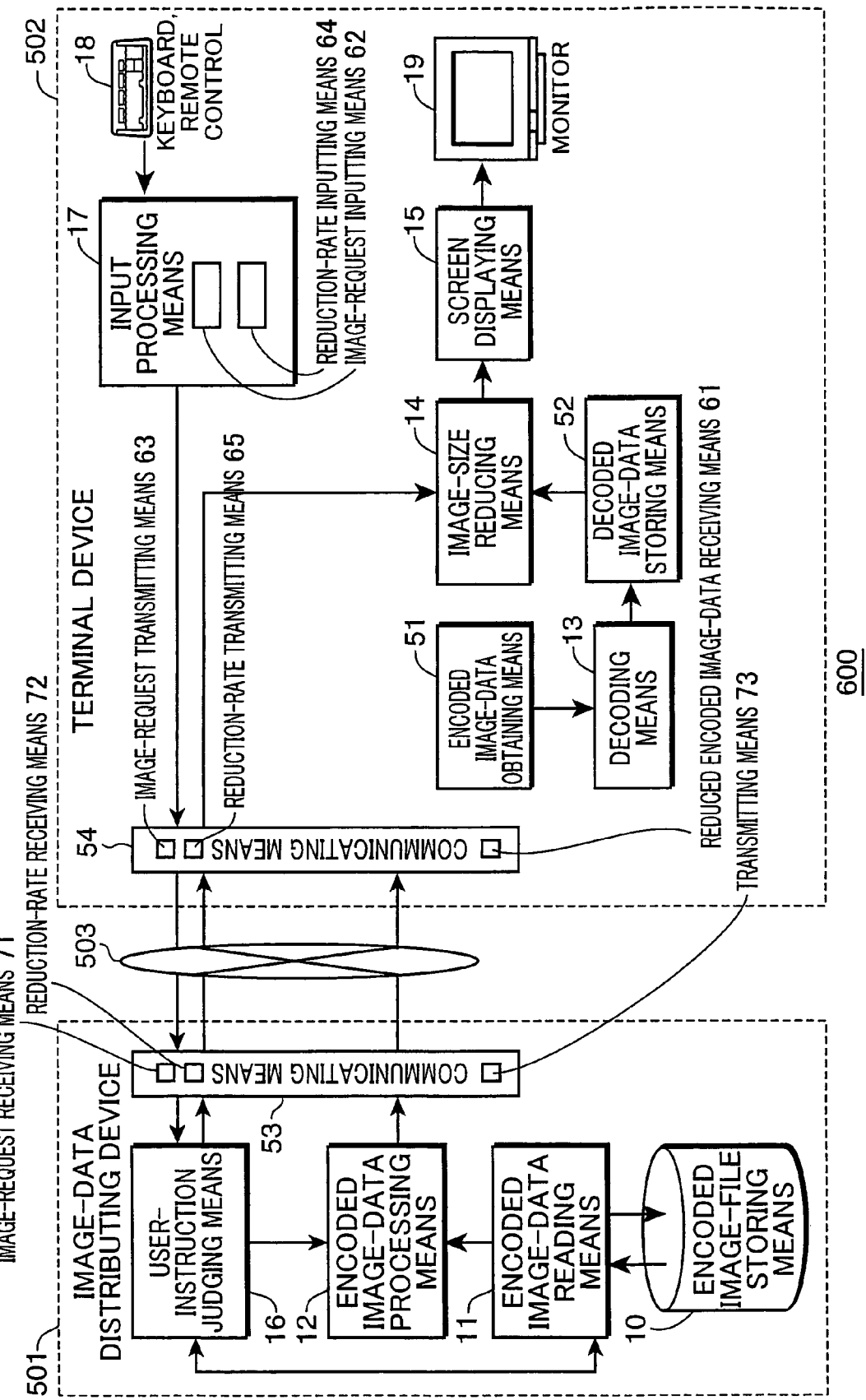
FIG. 12 is a block diagram of an image-data transmitting system according to a second embodiment of the present invention, showing its whole configuration.

FIG. 12 is a block diagram of an image-data transmitting system according to a second embodiment of the present invention, showing its whole configuration. This image-data transmitting system 600 is a system which transmits the image-data compressed and encoded (hereinafter, called the encoded image-data) by the JPEG method or the like, from a distributing device 501 which is an image-data distributing device, to a terminal device 502 owned by a user, over a network 503 such as the Internet. In addition, the user can designate, to the distributing device 501, the reduction size of an image to be transmitted. The distributing device 501 distributes encoded image-data which corresponds to the reduction size designated by the user.

In FIG. 12, component elements having the same numerals and characters as those of FIG. 1 have the same functions, and thus, their description is omitted.

As shown in FIG. 12, the image-data transmitting system 600 according to this second embodiment is configured such that the distributing device 501 is connected to a plurality of terminal devices which are set up for each user, over the network 503 such as the Internet. FIG. 12 typically shows only the single terminal device 502 of the plurality of terminal devices.

In FIG. 12, the distributing device 501, owned by a service provider which provides an image or the like, provides an image according to a user's request. Thus, it stores encode image-data which correspond to images in the encoded image-file storing means. The distributing device 501 distributes the encode image-data according to the user's request, over the network 503 such as the Internet, to the terminal device 502.

The terminal device 502 is a device which transmits information such as a user's request to the distributing device 501 by the user's operation, and receives various pieces of information including image-data. For example, if a request to distribute an image is issued from the terminal device 502 to the distributing device 501, image-data is distributed from the distributing device 501, and then, the terminal device 502 receives the distributed image-data, restores and reproduces it one after another.

Hence, the image-data transmitting system 600 is a system which distributes image-data from the distributing device 501 through the network 503 to the terminal device 502, and allows a user at the terminal device 502 to view a desired image and listen to its audio.

Furthermore, the image-data transmitting system 600 is characterized in that, if a user at the terminal device 502 makes a request, for example, to reduce a desired image, the distributing device 501 distributes reduced image-data of the image as reduced encoded image-data. For example, if a user wants to select a desired image out of a plurality of images, the user first requests the distributing device 501 to transmit reduced images such as thumbnail images. In addition, the user, for example, displays an index image including a plurality of thumbnail images, and then, selects the desired image out of them. In this way, the user can select the desired image beforehand, using the thumbnail images. This allows the user to have easier access.

The process of the image-data transmitting system 600 will be described below. In FIG. 12, various instructions from a user are inputted in the inputting means 18. The input processing means 17 receives these instructions. To do this, the input processing means 17 includes: an image-request inputting means 62 for receiving a request to designate encoded image-data which corresponds to one image (e.g., a request is made by designating the name of an image file), from among the plurality of pieces of encoded image-data which is stored in the encoded image-file storing means 10; and a reduction-rate inputting means 64 for receiving an input of the reduction rate (e.g., which is made by inputting the size of an image).

If the user inputs a request to distribute a reduced image using the inputting means 18, a communicating means 54 is notified, via the input processing means 17, of information such as an image-file name and an image size which has been instructed by the user. The communicating means 54 of the terminal device 502 communicates with the distributing device 501. Specifically, it transmits request information which shows a request from the user, over the network 503, to the distributing device 501. Or, it receives image-data or the like from the distributing device 501. Therefore, the communicating means 54 includes: an image-request transmitting means 63 for transmitting a request for encoded image-data; a reduction-rate transmitting means 65 for transmitting a reduction rate; and a reduced encoded image-data receiving means 61 for receiving the reduced encoded image-data.

Furthermore, a communicating means 53 of the distributing device 501 communicates, over the network 503, with the terminal device 502. In other words, the user-instruction judging means (hereinafter, called the judging means) 16 of the distributing device 501 is notified, via the communicating means 54, the network 503 and the communicating means 53, of information such as an image-file name or the like and an image size which has been instructed by the user. Therefore, the communicating means 53 includes: an image-request receiving means 71 for receiving a request for encoded image-data; a reduction-rate receiving means 72 for receiving a reduction rate; and a transmitting means 73 for transmitting the reduced encoded image-data.

The judging means 16 outputs image-identification information for searching for an image file based on an image-file name or the like which has been instructed by the user, and image size information for displaying the image of an image size which has been instructed by the user. In the encoded image-file storing means (hereinafter, called the storing means) 10 functioning as an encoded image-data storing means, encoded image-data which has been compressed and encoded by the JPEG method or the like is stored as a plurality of image files. The encoded image-data reading means (hereinafter, called the reading means) 11 reads image files which corresponds to the image-identification information, from the plurality of image files stored in the storing means 10. The encoded image-data of the read image files is processed by the encoded image-data processing means (hereinafter, called the processing means) 12, so that it is converted into a thumbnail image according to the reduction rate which corresponds to the image-size information, or reduced encoded image-data for a reduced image. The processed image-data for a reduced image is provided to the communicating means 53 which functions as the transmitting means 73. Then, it is transmitted, over the network 503, to the terminal device 502. In other words, the processed image-data for a reduced image is distributed as the reduced encoded image-data which has been processed as shown in FIG. 8.

The terminal device 502 receives the reduced encoded image-data which has been processed in this way. This reduced encoded image-data is obtained, via the communicating means 54 which functions as the reduced encoded image-data receiving means 61, by an encoded image-data obtaining means (hereinafter, called the obtaining means) 51, and then, it is temporarily stored by the obtaining means 51. The decoding means 13 decodes the encoded image-data of this reduced encoded image-data to restore it to decoded image-data of the same size as the original image. A decoded image-data storing means 52 stores the restored decoded image-data of the same size as the original image. The image-size reducing means (hereinafter, called the reducing means) 14 produces reduced image-data by thinning out picture elements of the decoded image-data obtained by the decoding means 13 according to the reduction rate which corresponds to the reduction size designated by the user. The screen displaying means 15 outputs the reduced image-data to the monitor 19 so that the reduced image-data is displayed on the screen of the monitor 19 which functions as a displaying means.

Figure 13:
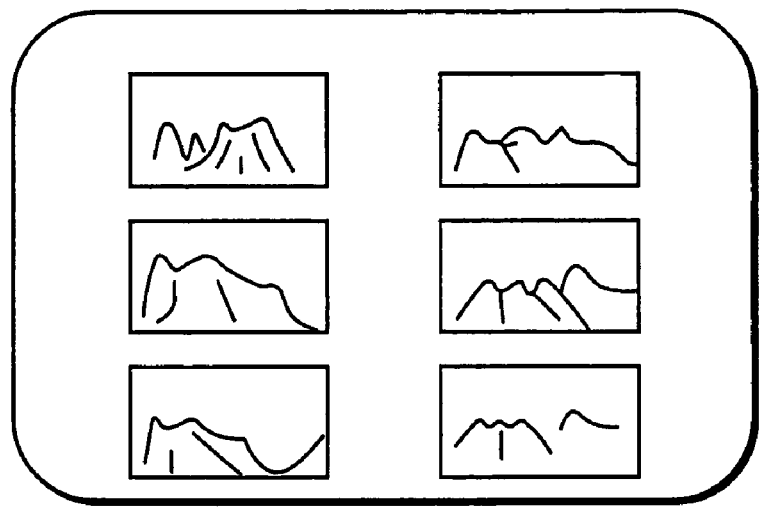
FIG. 13 is an illustration, showing an example of reduced images displayed on a monitor.
Figure 14:
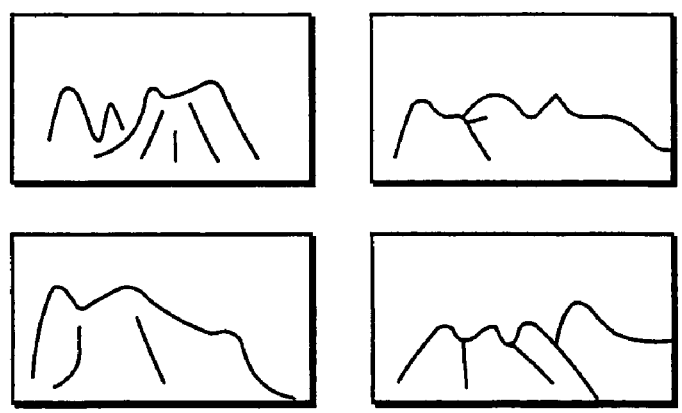
FIG. 14 is an illustration, showing another example of reduced images displayed on a monitor.

FIG. 13 and FIG. 14 are illustrations, showing an example of reduced images displayed on the screen of the monitor 19. FIG. 13 is an illustration, showing an example in which six reduced images are displayed as thumbnail images in the index form on the screen of the monitor 19. FIG. 14 is an illustration, showing an example in which four reduced images are displayed as thumbnail images in the index form on the screen of the monitor 19. As described above, in the image-data transmitting system 600, a user can designate the size of a reduced image as a request to distribute the image. Thereby, as shown in FIG. 13 and FIG. 14, reduced images of different sizes can be displayed on the screen of the monitor. This enables the user to select a desired image or the like, using thumbnail images of a desired size.

As described above, a request to distribute a reduced image is transmitted from the terminal device 502, and then, the distributing device 501 distributes reduced encoded image-data according to that request to the terminal device 502. Next, the terminal device 502 decodes the reduced encoded image-data to reproduce it as a thumbnail image. At this time, the image-data transmitting system 600 is characterized by processing encoded image-data into a reduced image and distributing it, using the processing means 12 configured as shown in FIG. 2.

In other words, as described in the first embodiment, as shown in FIG. 8, using the processing means 12, unnecessary coefficients of each processed macro-block are set to zero, based on visual properties of an image. This decreases the encoding quantity and thus lessens a transmission load on the network 503, leading to communication at higher speed. Furthermore, the image-data transmitting system 600 varies the number of effective coefficients suitably, according to an image's reduction rate and whether it is an image's boundary area or not. Therefore, a reduced image such as a thumbnail image can be transmitted without making its image quality poor, and thus, the thumbnail image whose image quality is not poor can be displayed in the terminal device 502. As a result, using a thumbnail image, a user can quickly search for the image desired by the user, from among numerous image files on the Internet or the like. If a thumbnail image is too small to visually judge it, a user can request a larger image size, and thus, can select the desired image by confirming it in further detail. Furthermore, the image-data transmitting system 600 varies the encoding quantity suitably according to the size of an image. This, lessening the encoding quantity and thereby keeping the transmission speed from lowering, prevents its image quality from becoming poor, even though a user makes the size of a thumbnail image large.

Furthermore, since the distributing device 501 holds encoded image-data of original images and distributes their reduced images, it only processes and transmits the encoded image-data. This allows a processing load on the distributing device 501 to lessen. For example, if a method is executed where an original image is encoded according to a reduction rate every time it is transmitted, encoding has to be executed for each transmission. In this case, if more terminals take part, an encoding load becomes heavier. In addition, if a method is executed where encoded image-data is decoded, an image is reduced and encoded again, and it is transmitted, then a decoding and encoding load also becomes heavier. In contrast, the distributing device 501 provided for the image-data transmitting system 600, first, holds the image-data to be ordinarily distributed as encoded image-data. Thus, even a smaller storage capacity is enough to hold image-data than the image-data not to be encoded. Furthermore, when the distributing device 501 distributes a reduced image, this encoded image-data may be simply processed by the processing means 12. This lessens a load imposed by the processing of producing a reduced image, thereby handling more terminals sufficiently.

Other Application (1) The present invention can also be applied to the technology of displaying an image on a small-screen unit such as a mobile phone and a mobile terminal. In other words, not only as a thumbnail image, but also in the case where an image is displayed on a smaller screen than an ordinal monitor screen, a reduced image can be displayed on the screen by decoding and reducing the reduced encoded image-data which is produced by using the image-data processing device, the image-data processing method, the image-data distributing device, or the image-data transmitting system according to the present invention.

(2) The present invention can also be applied to the technology of displaying a static image using web browser. In addition, in the case where an I-frame (or a frame encoded inside a frame) of a dynamic image (or moving picture) is displayed as a static image so that a user can select the dynamic image easily, the reduced encoded image-data which is produced by the technology according to the present invention can also be used.

(3) In the case where image editing is conducted, the present invention can also be applied. For example, in the case where processing is conducted such as cutting off a part of an image, changing the size of an image, and putting a mosaic on an image, when an image is temporarily displayed in the process of the editing before the final image is displayed after the processing, the reduced encoded image-data which is produced using the technology according to the present invention can be used. In the case where the editing of multimedia elements (such as a phonetic sound, a dynamic picture and characters) including a dynamic image is conducted using an authoring tool, the technology according to the present invention can also be used for displaying an image in the process of the editing.

Summary of Embodiments

Various embodiments mentioned above can be summarized as follows.

An image-data processing device, in which an original image is divided into a plurality of blocks that are made up of a plurality of picture elements, and in each block, from encoded image-data which is obtained by encoding a spatial-frequency component of the block as a plurality of spatial-frequency coefficients, reduced encoded image-data is produced which is encoded data on a reduced image that is obtained by reducing the original image to a given reduction rate, comprises: a block abstracting means for abstracting each block as a block to be processed, one after another, from the plurality of blocks; a DC-coefficient abstracting means for abstracting a direct-current component coefficient from the plurality of spatial-frequency coefficients of the block to be processed; an adjacent DC-coefficient abstracting means for abstracting the direct-current component coefficient of at least one adjacent block which is adjacent, in any of a horizontal direction, a vertical direction and an oblique direction, to the block to be processed, as at least one adjacent direct-current component coefficient; a DC-coefficient comparing means for comparing the direct-current component coefficient of the block to be processed and the at least one adjacent direct-current component coefficient, and calculating a value of a predetermined function of the direct-current component coefficient of the block to be processed and the at least one adjacent direct-current component coefficient, the function representing an extent of unevenness between the direct-current component coefficient of the block to be processed and the at least one adjacent direct-current component coefficient; a coefficient-set setting means for, if the value of the function is larger than a predetermined value, holding a smaller number of spatial-frequency coefficients than the plurality of spatial-frequency coefficients of the block to be processed according to the reduction rate, which have lower frequencies and include the direct-current component coefficient among the plurality of spatial-frequency coefficients of the block to be processed, and setting the other spatial-frequency coefficients to zero; and a DC-coefficient setting means for, if the value of the function is smaller than the predetermined value, holding only the direct-current component coefficient of the plurality of spatial-frequency coefficients of the block to be processed, and setting the other spatial-frequency coefficients to zero.

According to this configuration, if the block in the encoded image-data of the original image is in an area where the value of the function is small due to gentle change in brightness or color of the image, only the direct-current component coefficient of is used for the block. On the other hand, if the block is in a boundary area such as an outline in the image where the value of the function is large, limited number of lower spatial frequency-coefficients are used for the block. The number is based on the reduction rate of the image. In this way, the reduced encoded image-data for a reduced image is produced. In other words, in the image-data processing device, based on visual properties of an image, first, in an area where the change in brightness or color of an image is gentle and a block noise or the like is inconspicuous, only the direct-current component coefficient is used. This cuts down the number of effective coefficients, thus reducing the encoding quantity. In addition, in the image-data processing device, based on visual properties of an image, in a boundary area such as the outline of an image where a poor image quality caused by a reduction in coefficients stands out easily, coefficients on the low-frequency side having the number which is based on the image's reduction rate are selected. This prevents the quality of an image from becoming poor because of a reduction in coefficients, and at the same time, cuts down the number of effective coefficients, thus reducing the encoding quantity. In this way, in the image-data processing device, according to an image's reduction rate and whether it is an image's boundary area or not, the number of effective spatial-frequency coefficients is suitably varied. This reduces the encoding quantity, and thus, lessens a processing load before a reduced image is displayed. It also enables a reduced image to be displayed with preventing its image quality from becoming poor. Accordingly, using reduced encoded image-data produced by the image-data processing device, a reduced image can be displayed at high speed without making its image quality poor, even in the case where a relatively large reduced image is handled. As a result, when the image-data processing device produces a thumbnail image as a reduced image, the image-data processing device enables to display the thumbnail image at high speed without making its image quality poor even in the case where a relatively large thumbnail image is handled.

Preferably, the at least one adjacent block is one adjacent block, and the value of the function is an absolute value of a difference between the adjacent direct-current component coefficient of the one adjacent block and the direct-current component coefficient of the block to be processed Or preferably, the at least one adjacent block is plural adjacent blocks, and the value of the function is an absolute value of a difference between an average of the adjacent direct-current component coefficients of the plural adjacent blocks and the direct-current component coefficient of the block to be processed.

Or preferably, the at least one adjacent block is plural adjacent blocks, and the value of the function is an absolute value of a difference between a weighted-average obtained by weighted-average calculation, based on adjacent directions, of the adjacent direct-current component coefficients of the plural adjacent blocks, and the direct-current component coefficient of the block to be processed.

Or preferably, the at least one adjacent block is plural adjacent blocks, and the value of the function is a largest absolute value of the differences between adjacent direct-current component coefficients of the plural adjacent blocks and the direct-current component coefficient of the block to be processed.

Or preferably, the at least one adjacent block is plural adjacent blocks, and the value of the function is a summation of absolute values of the differences between adjacent direct-current component coefficients of the plural adjacent blocks and the direct-current component coefficient of the block to be processed.

Furthermore preferably, referring to the ratio of the number of the smaller number of spatial-frequency coefficients than the plurality of spatial-frequency coefficients which are held by the coefficient-set setting means to the number of the plurality of spatial-frequency coefficients as a coefficient reduction rate, the coefficient-set setting means divides the reduction rate into a plurality of levels, sets the coefficient reduction rate according to the levels of the reduction rate, and if the value of the function is larger than the predetermined value, holds the smaller number of spatial-frequency coefficients according to the coefficient reduction rate and sets the other spatial-frequency coefficients to zero.

More preferably, the image-data processing device further comprises: an input processing means for receiving an input of the reduction rate; a decoding means for decoding the reduced encoded image-data; an image-size reducing means for reducing the image size of the reduced encoded image-data which is decoded; and a screen displaying means for displaying on a screen the reduced encoded image-data which is reduced in a image size.

Furthermore preferably, the encoded image-data is colored; and the predetermined value is individually given for every color component.

Furthermore preferably, the encoded image-data is colored; and the coefficient-set setting means determines, individually for every color component, the number of the smaller number of spatial-frequency coefficients than the plurality of spatial-frequency coefficients.

More preferably, the encoded image-data is colored; and the block abstracting means abstracts the block to be processed only for limited predetermined color components.

More preferably, the encoded image data is image data encoded by variable-length coding; and the coefficient-set setting means and the DC coefficient setting means adds a code which shows an end of bit-string of a block to an end of bit-string of the spatial-frequency coefficients to be held and deletes the other spatial-frequency coefficients, and thereby, sets the other spatial-frequency coefficients to zero.

An image-data processing method, in which an original image is divided into a plurality of blocks that are made up of a plurality of picture elements, and in each block, from encoded image-data which is obtained by encoding a spatial-frequency component of the block as a plurality of spatial-frequency coefficients, reduced encoded image-data is produced which is encoded data on a reduced image that is obtained by reducing the original image to a given reduction rate, comprises: a first step of abstracting a direct-current component coefficient from the plurality of spatial-frequency coefficients; a second step of abstracting the direct-current component coefficient of at least one adjacent block which is adjacent, in any of a horizontal direction, a vertical direction and an oblique direction, to a block including the abstracted direct-current component coefficient, as at least one adjacent direct-current component coefficient; a third step of comparing the direct-current component coefficient of and the at least one adjacent direct-current component coefficient, and calculating a value of a predetermined function of the direct-current component coefficient and the at least one adjacent direct-current component coefficient, the function representing an extent of unevenness between the direct-current component coefficient and the at least one adjacent direct-current component coefficient; a fourth step of, if the value of the function is larger than a predetermined value, holding a smaller number of spatial-frequency coefficients than the plurality of spatial-frequency coefficients according to the reduction rate, which have lower frequencies and include the direct-current component coefficient among the plurality of spatial-frequency coefficients, and setting the other spatial-frequency coefficients to zero; and a fifth step of, if the value of the function is smaller than the predetermined value, holding only the direct-current component coefficient of the plurality of spatial-frequency coefficients, and setting the other spatial-frequency coefficients to zero, wherein each step is executed on each block, so that the reduced encoded image-data is produced which is encoded data on a reduced image that is obtained by reducing the original image to the reduction rate.

According to this configuration, if the block in the encoded image-data of the original image is in an area where the value of the function is small due to gentle change in brightness or color of the image, only the direct-current component coefficient of is used for the block. On the other hand, if the block is in a boundary area such as an outline in the image where the value of the function is large, limited number of lower spatial frequency-coefficients are used for the block. The number is based on the reduction rate of the image. In this way, the reduced encoded image-data for a reduced image is produced. In other words, in the image-data processing method, based on visual properties of an image, first, in an area where the change in brightness or color of an image is gentle and a block noise or the like is inconspicuous, only the direct-current component coefficient is used. This cuts down the number of effective coefficients, thus reducing the encoding quantity. In addition, in the image-data processing method, based on visual properties of an image, in a boundary area such as the outline of an image where a poor image quality caused by a reduction in coefficients stands out easily, coefficients on the low-frequency side having the number which is based on the image's reduction rate are selected. This prevents the quality of an image from becoming poor because of a reduction in coefficients, and at the same time, cuts down the number of effective coefficients, thus reducing the encoding quantity. In this way, in the image-data processing method, according to an image's reduction rate and whether it is an image's boundary area or not, the number of effective spatial-frequency coefficients is suitably varied. This reduces the encoding quantity and enables reduced encoded image-data to be produced. Herein, the reduced encoded image-data is used for a reduced image whose quality is prevented from becoming poor. Accordingly, using reduced encoded image-data produced by the image-data processing method, a processing load can be lessened before a reduced image is displayed and the image quality can be prevented from becoming poor, even in the case where a relatively large reduced image is displayed.

Preferably, the at least one adjacent block is one adjacent block, and the value of the function is an absolute value of a difference between the adjacent direct-current component coefficient of the one adjacent block and the direct-current component coefficient.

Or preferably, the at least one adjacent block is plural adjacent blocks, and the value of the function is an absolute value of a difference between an average of the adjacent direct-current component coefficients of the plural adjacent blocks and the direct-current component coefficient.

Or preferably, the at least one adjacent block is plural adjacent blocks, and the value of the function is an absolute value of a difference between a weighted-average obtained by weighted-average calculation, based on adjacent directions, of the adjacent direct-current component coefficients of the plural adjacent blocks, and the direct-current component coefficient.

Or preferably, the at least one adjacent block is plural adjacent blocks, and the value of the function is a largest absolute value of the differences between adjacent direct-current component coefficients of the plural adjacent blocks and the direct-current component coefficient.

Or preferably, the at least one adjacent block is plural adjacent blocks, and the value of the function is a summation of absolute values of the differences between adjacent direct-current component coefficients of the plural adjacent blocks and the direct-current component coefficient.

Furthermore preferably, the fourth step, referring to the ratio of the number of the smaller number of spatial-frequency coefficients than the plurality of spatial-frequency coefficients which are held in the fourth step to the number of the plurality of spatial-frequency coefficients as a coefficient reduction rate, divides the reduction rate into a plurality of levels, sets the coefficient reduction rate according to the levels of the reduction rate, and if the value of the function is larger than the predetermined value, holds the smaller number of spatial-frequency coefficients according to the coefficient reduction rate and sets the other spatial-frequency coefficients to zero.

More preferably, the image-data processing method further comprising: a sixth step of receiving an input of the reduction rate; a seventh step of decoding the reduced encoded image-data; an eighth step of reducing an image size of the reduced encoded image-data which is decoded; and a ninth step of displaying on a screen the reduced encoded image-data which is reduced in an image size.

Furthermore preferably, the encoded image-data is colored; and the predetermined value is individually given for every color component.

Furthermore preferably, the encoded image-data is colored; and in the fourth step, the number of the smaller number of spatial-frequency coefficients than the plurality of spatial-frequency coefficients is determined individually for every color component.

More preferably, the encoded image-data is colored; and the first to fifth steps for each block are executed only for limited predetermined color components.

More preferably, the encoded image data is image data encoded by variable-length coding; and the fourth and the fifth steps adds a code which shows an end of bit-string of a block to an end of bit-string of the spatial-frequency coefficients to be held and deletes the other spatial-frequency coefficients, and thereby, sets the other spatial-frequency coefficients to zero.

An image-data distributing device, in which an original image is divided into a plurality of blocks that are made up of a plurality of picture elements, in each block, from encoded image-data which is obtained by encoding a spatial-frequency component of the block as a plurality of spatial-frequency coefficients, reduced encoded image-data is produced which is encoded data on a reduced image that is obtained by reducing the original image to a given reduction rate, and the reduced encoded image-data is transmitted over a network, comprises: an encoded image-data storing means for storing a plurality of pieces of the encoded image-data; an encoded image-data reading means for reading encoded image-data which corresponds to one image, from among the plurality of pieces of encoded image-data which is stored in the encoded image-data storing means; and the image-data processing device mentioned above, wherein the image-data processing device produces the reduced encoded image-data, from encoded image-data which is read by the encoded image-data reading means, and the image-data distributing device further comprises a transmitting means for transmitting, to the network, the reduced encoded image-data which is produced by the image-data processing device.

An image-data transmitting system comprises: the image-data distributing device mentioned above and a terminal device which is connected over the network to the image-data distributing device, wherein the terminal device includes: a reduced encoded image-data receiving means for receiving the reduced encoded image-data which is transmitted by the transmitting means; a decoding means for decoding the reduced encoded image-data which is received; an image-size reducing means for reducing an image size of the reduced encoded image-data which is decoded; and a screen displaying means for displaying on a screen the reduced encoded image-data which is reduced in an image size.

According to the configuration of the image-data distributing device and the image-data transmitting system, if the block in the encoded image-data of the original image is in an area where the value of the function is small due to gentle change in brightness or color of the image, only the direct-current component coefficient of is used for the block. On the other hand, if the block is in a boundary area such as an outline in the image where the value of the function is large, limited number of lower spatial frequency-coefficients are used for the block. The number is based on the reduction rate of the image. In this way, the reduced encoded image-data for a reduced image is produced. In other words, in the image-data distributing device and the image-data transmitting system, based on visual properties of an image, first, in an area where the change in brightness or color of an image is gentle and a block noise or the like is inconspicuous, only the direct-current component coefficient is used. This cuts down the number of effective coefficients, thus reducing the encoding quantity. In addition, in the image-data transmitting system, based on visual properties of an image, in a boundary area such as the outline of an image where a poor image quality caused by a reduction in coefficients stands out easily, coefficients on the low-frequency side having the number which is based on the image's reduction rate are selected. This prevents the quality of an image from becoming poor because of a reduction in coefficients, and at the same time, cuts down the number of effective coefficients, thus reducing the encoding quantity. In this way, in the image-data distributing device and the image-data transmitting system, according to an image's reduction rate and whether it is an image's boundary area or not, the number of effective spatial-frequency coefficients is suitably varied. This reduces the encoding quantity, and thus, lessens a transmission load at the time when a reduced image is transmitted. It also enables a reduced image to be transmitted with preventing its image quality from becoming poor. Accordingly, using reduced encoded image-data produced by the image-data distributing device and the image-data transmitting system, a reduced image can be transmitted at high speed without making its image quality poor, even in the case where a relatively large reduced image is handled. This makes it possible to display, at high speed in a terminal device, a reduced image which has a desired reduction size and whose image quality is prevented from becoming poor. As a result, either the image-data distributing device or the image-data transmitting system can produce and transmit a thumbnail image as a reduced image at high speed without making its image quality poor even in the case where a relatively large thumbnail image is handled.

Preferably, the image-data transmitting system is so configured that the terminal device further includes, an image-request inputting means for receiving a request to designate encoded image-data which corresponds to one image, from among the plurality of pieces of encoded image-data which is stored in the encoded image-data storing means, and an image-request transmitting means for transmitting the received request, over the network, to the image-data distributing device; the image-data distributing device further includes an image-request receiving means for receiving the transmitted request; and the encoded image-data reading means reads encoded image-data which corresponds to the request, from among the plurality of pieces of encoded image-data which is stored in the encoded image-data storing means.

More preferably, the image-data transmitting system is so configured that the terminal device further includes, a reduction rate inputting means for receiving an input of the reduction rate, and a reduction rate transmitting means for transmitting the received reduction rate, over the network, to the image-data distributing device; the image-data distributing device further includes a reduction rate receiving means for receiving the transmitted reduction rate; and the image-data processing device produces the reduced encoded image-data by setting the received reduction rate as the given reduction rate.

This application is based on Japanese patent application serial No. 2003-000274, filed in Japan Patent Office on Jan. 6, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image-data processing device, in which an original image is divided into a plurality of blocks that are made up of a plurality of picture elements, and in each block, from encoded image-data which is obtained by encoding a spatial-frequency component of the block as a plurality of spatial-frequency coefficients, reduced encoded image-data is produced which is encoded data on a reduced image that is obtained by reducing the original image to a given reduction rate, comprising:

a block abstracting means for abstracting each block as a block to be processed, one after another, from the plurality of blocks;

a DC-coefficient abstracting means for abstracting a direct-current component coefficient from the plurality of spatial-frequency coefficients of the block to be processed;

an adjacent DC-coefficient abstracting means for abstracting the direct-current component coefficient of at least one adjacent block which is adjacent, in any of a horizontal direction, a vertical direction and an oblique direction, to the block to be processed, as at least one adjacent direct-current component coefficient;

a DC-coefficient comparing means for comparing the direct-current component coefficient of the block to be processed and the at least one adjacent direct-current component coefficient, and calculating a value of a predetermined function of the direct-current component coefficient of the block to be processed and the at least one adjacent direct-current component coefficient, the function representing an extent of unevenness between the direct-current component coefficient of the block to be processed and the at least one adjacent direct-current component coefficient;

a coefficient-set setting means for, if the value of the function is larger than a predetermined value, holding a smaller number of spatial-frequency coefficients than the plurality of spatial-frequency coefficients of the block to be processed according to the reduction rate, which have lower frequencies and include the direct-current component coefficient among the plurality of spatial-frequency coefficients of the block to be processed, and setting the other spatial-frequency coefficients to zero; and a DC-coefficient setting means for, if the value of the function is smaller than the predetermined value, holding only the direct-current component coefficient of the plurality of spatial-frequency coefficients of the block to be processed, and setting the other spatial-frequency coefficients to zero.

2. The image-data processing device according to claim 1, wherein the at least one adjacent block is one adjacent block, and the value of the function is an absolute value of a difference between the adjacent direct-current component coefficient of the one adjacent block and the direct-current component coefficient of the block to be processed.

3. The image-data processing device according to claim 1, wherein the at least one adjacent block is plural adjacent blocks, and the value of the function is an absolute value of a difference between an average of the adjacent direct-current component coefficients of the plural adjacent blocks and the direct-current component coefficient of the block to be processed.

4. The image-data processing device according to claim 1, wherein the at least one adjacent block is plural adjacent blocks, and the value of the function is an absolute value of a difference between a weighted-average obtained by weighted-average calculation, based on adjacent directions, of the adjacent direct-current component coefficients of the plural adjacent blocks, and the direct-current component coefficient of the block to be processed.

5. The image-data processing device according to claim 1, wherein the at least one adjacent block is plural adjacent blocks, and the value of the function is a largest absolute value of the differences between adjacent direct-current component coefficients of the plural adjacent blocks and the direct-current component coefficient of the block to be processed.

6. The image-data processing device according to claim 1, wherein the at least one adjacent block is plural adjacent blocks, and the value of the function is a summation of absolute values of the differences between adjacent direct-current component coefficients of the plural adjacent blocks and the direct-current component coefficient of the block to be processed.

7. The image-data processing device according to claim 1, wherein referring to the ratio of the number of the smaller number of spatial-frequency coefficients than the plurality of spatial-frequency coefficients which are held by the coefficient-set setting means to the number of the plurality of spatial-frequency coefficients as a coefficient reduction rate, the coefficient-set setting means divides the reduction rate into a plurality of levels, sets the coefficient reduction rate according to the levels of the reduction rate, and if the value of the function is larger than the predetermined value, holds the smaller number of spatial-frequency coefficients according to the coefficient reduction rate and sets the other spatial-frequency coefficients to zero.

8. The image-data processing device according to claim 1, further comprising:
an input processing means for receiving an input of the reduction rate;
a decoding means for decoding the reduced encoded image-data;
an image-size reducing means for reducing the image size of the reduced encoded image-data which is decoded; and
a screen displaying means for displaying on a screen the reduced encoded image-data which is reduced in a image size.

9. The image-data processing device according to claim 1, wherein:
the encoded image-data is colored; and
the predetermined value is individually given for every color component.

10. The image-data processing device according to claim 1, wherein:
the encoded image-data is colored; and
the coefficient-set setting means determines, individually for every color component, the number of the smaller number of spatial-frequency coefficients than the plurality of spatial-frequency coefficients.

11. The image-data processing device according to claim 1, wherein:
the encoded image-data is colored; and
the block abstracting means abstracts the block to be processed only for limited predetermined color components.

12. The image-data processing device according to claim 1, wherein:
the encoded image data is image data encoded by variable-length coding; and
the coefficient-set setting means and the DC coefficient setting means adds a code which shows an end of bit-string of a block to an end of bit-string of the spatial-frequency coefficients to be held and deletes the other spatial-frequency coefficients, and thereby, sets the other spatial-frequency coefficients to zero.

13. An image-data processing method, in which an original image is divided into a plurality of blocks that are made up of a plurality of picture elements, and in each block, from encoded image-data which is obtained by encoding a spatial-frequency component of the block as a plurality of spatial-frequency coefficients, reduced encoded image-data is produced which is encoded data on a reduced image that is obtained by reducing the original image to a given reduction rate, comprising:
a first step of abstracting a direct-current component coefficient from the plurality of spatial-frequency coefficients;
a second step of abstracting the direct-current component coefficient of at least one adjacent block which is adjacent, in any of a horizontal direction, a vertical direction and an oblique direction, to a block including the abstracted direct-current component coefficient, as at least one adjacent direct-current component coefficient;
a third step of comparing the direct-current component coefficient of and the at least one adjacent direct-current component coefficient, and calculating a value of a predetermined function of the direct-current component coefficient and the at least one adjacent direct-current component coefficient, the function representing an extent of unevenness between the direct-current component coefficient and the at least one adjacent direct-current component coefficient;
a fourth step of, if the value of the function is larger than a predetermined value, holding a smaller number of spatial-frequency coefficients than the plurality of spatial-frequency coefficients according to the reduction rate, which have lower frequencies and include the direct-current component coefficient among the plurality of spatial-frequency coefficients, and setting the other spatial-frequency coefficients to zero; and
a fifth step of, if the value of the function is smaller than the predetermined value, holding only the direct-current component coefficient of the plurality of spatial-frequency coefficients, and setting the other spatial-frequency coefficients to zero,
wherein each step is executed on each block, so that the reduced encoded image-data is produced which is encoded data on a reduced image that is obtained by reducing the original image to the reduction rate.

14. The image-data processing method according to claim 13, wherein the at least one adjacent block is one adjacent block, and the value of the function is an absolute value of a difference between the adjacent direct-current component coefficient of the one adjacent block and the direct-current component coefficient.

15. The image-data processing method according to claim 13, wherein the at least one adjacent block is plural adjacent blocks, and the value of the function is an absolute value of a difference between an average of the adjacent direct-current component coefficients of the plural adjacent blocks and the direct-current component coefficient.

16. The image-data processing method according to claim 13, wherein the at least one adjacent block is plural adjacent blocks, and the value of the function is an absolute value of a difference between a weighted-average obtained by weighted-average calculation, based on adjacent directions, of the adjacent direct-current component coefficients of the plural adjacent blocks, and the direct-current component coefficient.

17. The image-data processing method according to claim 13, wherein the at least one adjacent block is plural adjacent blocks, and the value of the function is a largest absolute value of the differences between adjacent direct-current component coefficients of the plural adjacent blocks and the direct-current component coefficient.

18. The image-data processing method according to claim 13, wherein the at least one adjacent block is plural adjacent blocks, and the value of the function is a summation of absolute values of the differences between adjacent direct-current component coefficients of the plural adjacent blocks and the direct-current component coefficient.

19. The image-data processing method according to claim 13, wherein: the fourth step, referring to the ratio of the number of the smaller number of spatial-frequency coefficients than the plurality of spatial-frequency coefficients which are held in the fourth step to the number of the plurality of spatial-frequency coefficients as a coefficient reduction rate, divides the reduction rate into a plurality of levels, sets the coefficient reduction rate according to the levels of the reduction rate, and if the value of the function is larger than the predetermined value, holds the smaller number of spatial-frequency coefficients according to the coefficient reduction rate and sets the other spatial-frequency coefficients to zero.

20. The image-data processing method according to 13, further comprising:
a sixth step of receiving an input of the reduction rate;
a seventh step of decoding the reduced encoded image-data;
an eighth step of reducing an image size of the reduced encoded image-data which is decoded; and
a ninth step of displaying on a screen the reduced encoded image-data which is reduced in an image size.

21. The image-data processing method according to claim 13, wherein:
the encoded image-data is colored; and
the predetermined value is individually given for every color component.

22. The image-data processing method according to claim 13, wherein:
the encoded image-data is colored; and
in the fourth step, the number of the smaller number of spatial-frequency coefficients than the plurality of spatial-frequency coefficients is determined individually for every color component.

23. The image-data processing method according to claims 13, wherein:
the encoded image-data is colored; and
the first to fifth steps for each block are executed only for limited predetermined color components.

24. The image-data processing method according to claims 13, wherein:
the encoded image data is image data encoded by variable-length coding; and
the fourth and the fifth steps adds a code which shows an end of bit-string of a block to an end of bit-string of the spatial-frequency coefficients to be held and deletes the other spatial-frequency coefficients, and thereby, sets the other spatial-frequency coefficients to zero.

25. An image-data distributing device, in which an original image is divided into a plurality of blocks that are made up of a plurality of picture elements, in each block, from encoded image-data which is obtained by encoding a spatial-frequency component of the block as a plurality of spatial-frequency coefficients, reduced encoded image-data is produced which is encoded data on a reduced image that is obtained by reducing the original image to a given reduction rate, and the reduced encoded image-data is transmitted over a network, comprising:
an encoded image-data storing means for storing a plurality of pieces of the encoded image-data;
an encoded image-data reading means for reading encoded image-data which corresponds to one image, from among the plurality of pieces of encoded image-data which is stored in the encoded image-data storing means; and
an image-data processing device, including:
a block abstracting means for abstracting each block as a block to be processed, one after another, from the plurality of blocks;
a DC-coefficient abstracting means for abstracting a direct-current component coefficient from the plurality of spatial-frequency coefficients of the block to be processed;
an adjacent DC-coefficient abstracting means for abstracting the direct-current component coefficient of at least one adjacent block which is adjacent, in any of a horizontal direction, a vertical direction and an oblique direction, to the block to be processed, as at least one adjacent direct-current component coefficient;
a DC-coefficient comparing means for comparing the direct-current component coefficient of the block to be processed and the at least one adjacent direct-current component coefficient, and calculating a value of a predetermined function of the direct-current component coefficient of the block to be processed and the at least one adjacent direct-current component coefficient, the function representing an extent of unevenness between the direct-current component coefficient of the block to be processed and the at least one adjacent direct-current component coefficient;
a coefficient-set setting means for, if the value of the function is larger than a predetermined value, holding a smaller number of spatial-frequency coefficients than the plurality of spatial-frequency coefficients of the block to be processed according to the reduction rate, which have lower frequencies and include the direct-current component coefficient among the plurality of spatial-frequency coefficients of the block to be processed, and setting the other spatial-frequency coefficients to zero; and
a DC-coefficient setting means for, if the value of the function is smaller than the predetermined value, holding only the direct-current component coefficient of the plurality of spatial-frequency coefficients of the block to be processed, and setting the other spatial-frequency coefficients to zero, wherein the image-data processing device produces the reduced encoded image-data, from encoded image-data which is read by the encoded image-data reading means, and the image-data distributing device further comprises a transmitting means for transmitting, to the network, the reduced encoded image-data which is produced by the image-data processing device.

26. An image-data transmitting system, comprising an image-data distributing device, in which an original image is divided into a plurality of blocks that are made up of a plurality of picture elements, in each block, from encoded image-data which is obtained by encoding a spatial-frequency component of the block as a plurality of spatial-frequency coefficients, reduced encoded image-data is produced which is encoded data on a reduced image that is obtained by reducing the original image to a given reduction rate, and the reduced encoded image-data is transmitted over a network, including:
an encoded image-data storing means for storing a plurality of pieces of the encoded image-data;
an encoded image-data reading means for reading encoded image-data which corresponds to one image, from among the plurality of pieces of encoded image-data which is stored in the encoded image-data storing means; and
an image-data processing device, in which an original image is divided into a plurality of blocks that are made up of a plurality of picture elements, and in each block, from encoded image-data which is obtained by encoding a spatial-frequency component of the block as a plurality of spatial-frequency coefficients, reduced encoded image-data is produced which is encoded data on a reduced image that is obtained by reducing the original image to a given reduction rate, having:
a block abstracting means for abstracting each block as a block to be processed, one after another, from the plurality of blocks;
a DC-coefficient abstracting means for abstracting a direct-current component coefficient from the plurality of spatial-frequency coefficients of the block to be processed;
an adjacent DC-coefficient abstracting means for abstracting the direct-current component coefficient of at least one adjacent block which is adjacent, in any of a horizontal direction, a vertical direction and an oblique direction, to the block to be processed, as at least one adjacent direct-current component coefficient;
a DC-coefficient comparing means for comparing the direct-current component coefficient of the block to be processed and the at least one adjacent direct-current component coefficient, and calculating a value of a predetermined function of the direct-current component coefficient of the block to be processed and the at least one adjacent direct-current component coefficient, the function representing an extent of unevenness between the direct-current component coefficient of the block to be processed and the at least one adjacent direct-current component coefficient;
a coefficient-set setting means for, if the value of the function is larger than a predetermined value, holding a smaller number of spatial-frequency coefficients than the plurality of spatial-frequency coefficients of the block to be processed according to the reduction rate, which have lower frequencies and include the direct-current component coefficient among the plurality of spatial-frequency coefficients of the block to be processed, and setting the other spatial-frequency coefficients to zero; and
a DC-coefficient setting means for, if the value of the function is smaller than the predetermined value, holding only the direct-current component coefficient of the plurality of spatial-frequency coefficients of the block to be processed, and setting the other spatial-frequency coefficients to zero, wherein the image-data processing device produces the reduced encoded image-data, from encoded image-data which is read by the encoded image-data reading means, the image-data distributing device further comprises a transmitting means for transmitting, to the network, the reduced encoded image-data which is produced by the image-data processing device, and
the image-data transmitting system further comprises a terminal device which is connected over the network to the image-data distributing device, wherein the terminal device includes:
a reduced encoded image-data receiving means for receiving the reduced encoded image-data which is transmitted by the transmitting means;
a decoding means for decoding the reduced encoded image-data which is received;
an image-size reducing means for reducing an image size of the reduced encoded image-data which is decoded; and
a screen displaying means for displaying on a screen the reduced encoded image-data which is reduced in an image size.

27. The image-data transmitting system according to claim 26, wherein:
the terminal device further includes,
an image-request inputting means for receiving a request to designate encoded image-data which corresponds to one image, from among the plurality of pieces of encoded image-data which is stored in the encoded image-data storing means, and
an image-request transmitting means for transmitting the received request, over the network, to the image-data distributing device;
the image-data distributing device further includes an image-request receiving means for receiving the transmitted request; and
the encoded image-data reading means reads encoded image-data which corresponds to the request, from among the plurality of pieces of encoded image-data which is stored in the encoded image-data storing means.

28. The image-data transmitting system according to claim 26, wherein:
the terminal device further includes,
a reduction rate inputting means for receiving an input of the reduction rate, and a reduction rate transmitting means for transmitting the received reduction rate, over the network, to the image-data distributing device;
the image-data distributing device further includes a reduction rate receiving means for receiving the transmitted reduction rate; and
the image-data processing device produces the reduced encoded image-data by setting the received reduction rate as the given reduction rate.

* * * * *